United States Patent
Cha et al.

(10) Patent No.: US 11,510,174 B2
(45) Date of Patent: Nov. 22, 2022

(54) METHOD FOR TRANSMITTING OR RECEIVING POSITIONING INFORMATION, AND DEVICE THEREFOR

(71) Applicant: LG Electronics Inc., Seoul (KR)

(72) Inventors: Hyunsu Cha, Seoul (KR); Kijun Kim, Seoul (KR); Sukhyon Yoon, Seoul (KR); Hyunsoo Ko, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/422,150

(22) PCT Filed: Jan. 9, 2020

(86) PCT No.: PCT/KR2020/000423
§ 371 (c)(1),
(2) Date: Jul. 9, 2021

(87) PCT Pub. No.: WO2020/145700
PCT Pub. Date: Jul. 16, 2020

(65) Prior Publication Data
US 2022/0095265 A1    Mar. 24, 2022

Related U.S. Application Data

(60) Provisional application No. 62/791,507, filed on Jan. 11, 2019.

(51) Int. Cl.
*H04W 64/00* (2009.01)
*H04L 5/00* (2006.01)

(52) U.S. Cl.
CPC ......... *H04W 64/006* (2013.01); *H04L 5/0051* (2013.01)

(58) Field of Classification Search
CPC ... H04W 64/006; H04W 24/10; H04W 64/00; H04L 5/0051; H04L 5/0023; H04L 5/0091; H04L 5/0048
See application file for complete search history.

(56) References Cited

U.S. PATENT DOCUMENTS

2010/0260154 A1 * 10/2010 Frank ................ G01S 5/10
370/336
2016/0156424 A1 6/2016 Mirbagheri
(Continued)

FOREIGN PATENT DOCUMENTS

EP       2677336     12/2013
JP     2018528692     9/2018
(Continued)

OTHER PUBLICATIONS

International Search Report and Written Opinion in International Appln. No. PCT/KR2020/000423, dated Apr. 24, 2020, 15 pages (with English translation).
(Continued)

*Primary Examiner* — Kabir A Timory
(74) *Attorney, Agent, or Firm* — Fish & Richardson P.C.

(57) ABSTRACT

The present disclosure provides a method for reporting positioning information by a terminal in a wireless communication system. Specifically, the method comprises: receiving information relating to a plurality of positioning reference signal (PRS) resource sets including a plurality of PRS resources; measuring each of the plurality of PRS resources to acquire pieces of positioning information; and reporting at least one piece of positioning information and information relating to a PRS resource for the at least one piece of positioning information, among the pieces of the positioning information.

13 Claims, 28 Drawing Sheets

(56) References Cited

U.S. PATENT DOCUMENTS

2016/0286433 A1 9/2016 Mirbagheri
2017/0366244 A1* 12/2017 Lee .................... H04B 17/24
2018/0139763 A1* 5/2018 Bitra .................. H04L 27/2662

FOREIGN PATENT DOCUMENTS

| KR | 20170040770 | 4/2017 |
| KR | 20170107975 | 9/2017 |
| KR | 20180018237 | 2/2018 |

OTHER PUBLICATIONS

Extended European Search Report in European Appln. No. 20738490.0, dated Feb. 3, 2022, 12 pages.
LG Electronics, "Discussion on Possible Techniques for NR Positioning," R1-1810315, Presented at 3GPP TSG RAN WG1 Meeting #94bis, Chengdu, China, Oct. 8-12, 2018, 7 pages.

* cited by examiner (A) CONTROL-PLANE PROTOCOL STACK (B) USER-PLANE PROTOCOL STACK (a)

(b)

METHOD FOR TRANSMITTING OR RECEIVING POSITIONING INFORMATION, AND DEVICE THEREFOR

CROSS-REFERENCE TO RELATED APPLICATIONS

This application is a National Stage application under 35 U.S.C. § 371 of International Application No. PCT/KR2020/000423, filed on Jan. 9, 2020, which claims the benefit of U.S. Provisional Application No. 62/791,507, filed on Jan. 11, 2019. The disclosures of the prior applications are incorporated by reference in their entirety.

TECHNICAL FIELD

The present disclosure relates to a method for transmitting or receiving positioning information and a device therefor, and more particularly, to a method for configuring positioning information for improving positioning accuracy and a device therefor.

BACKGROUND

As more and more communication devices require greater communication traffic as the times flow, a next-generation 5G system, which is a wireless broadband communication improved over the existing LTE system, is required. In this next-generation 5G system, called NewRAT, communication scenarios are classified into Enhanced Mobile BroadBand (eMBB)/Ultra-reliability and low-latency communication (URLLC)/Massive Machine-Type Communications (mMTC).

Here, eMBB is a next-generation mobile communication scenario having characteristics such as High Spectrum Efficiency, High User Experienced Data Rate, and High Peak Data Rate. URLLC is a next-generation mobile communication scenario (e.g., V2X, Emergency Service, Remote Control) having features such as Ultra Reliable, Ultra Low Latency, and Ultra High Availability. mMTC is a next-generation mobile communication scenario with characteristics of Low Cost, Low Energy, Short Packet, and Massive Connectivity (e.g., IoT).

SUMMARY

An object of the present disclosure is to provide a method for transmitting or receiving positioning information and a device therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

In one aspect of the present disclosure, provided herein is a method for reporting positioning information by a terminal in a wireless communication system, the method including receiving information related to a plurality of positioning reference signal (PRS) resource sets including a plurality of PRS resources, measuring each of the plurality of PRS resources and obtaining positioning information, and reporting at least one positioning information among positioning information and information related to a PRS resource for the at least one piece of positioning information.

Herein, the information related to the PRS resource may include an identifier (ID) of a PRS resource set including the PRS resource.

Herein, the information related to the PRS resource may further include an ID for a transmission and reception point (TRP) assigned the PRS resource set.

The positioning information may be reference signal received powers (RSRPs) or signal to interference and noise ratios (SINRs) for each of the plurality of PRS resources.

The information related to the PRS resource may be information related to a PRS resource having a highest RSRP among the RSRPs or a PRS resource having a highest SINR among the SINRs.

Each of the plurality of PRS resource sets may be related to each of a plurality of base stations.

The terminal may be capable of communicating with at least one of a terminal other than the terminal, a network, a base station, and an autonomous vehicle.

In another aspect of the present disclosure, provided herein is an apparatus for reporting positioning information in a wireless communication system, including at least one processor, and at least one memory operably connected to the at least one processor and configured to store instructions causing, when executed, the at least one processor to perform a specific operation, wherein the specific operation may include receiving information related to a plurality of positioning reference signal (PRS) resource sets including a plurality of PRS resources, measuring each of the plurality of PRS resources and obtaining pieces of positioning information, and reporting at least one positioning information among the positioning information and information related to a PRS resource for the at least one positioning information.

Herein, the information related to the PRS resource may include an identifier (ID) of a PRS resource set including the PRS resource.

Herein, the information related to the PRS resource may further include an ID for a transmission and reception point (TRP) assigned the PRS resource set.

The positioning information may be reference signal received powers (RSRPs) or signal to interference and noise ratios (SINRs) for each of the plurality of PRS resources.

The information related to the PRS resource may be information related to a PRS resource having a highest RSRP among the RSRPs or a PRS resource having a highest SINR among the SINRs.

Each of the plurality of PRS resource sets may be related to each of a plurality of base stations.

The apparatus may be capable of communicating with at least one of a terminal, a network, a base station, and an autonomous vehicle.

In another aspect of the present disclosure, provided herein is a terminal for reporting positioning information in a wireless communication system, including at least one transceiver, at least one processor, and at least one memory operably connected to the at least one processor and configured to store instructions causing, when executed, the at least one processor to perform a specific operation, wherein the specific operation may include receiving information related to a plurality of positioning reference signal (PRS) resource sets including a plurality of PRS resources through the at least one transceiver, measuring each of the plurality of PRS resources and obtaining positioning information, and reporting at least one positioning information among the positioning information and information related to a PRS resource for the at least one positioning information, through the at least one transceiver.

According to the present disclosure, accuracy may be improved in measuring the location of a terminal.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DETAILED DESCRIPTION

Figure 1:
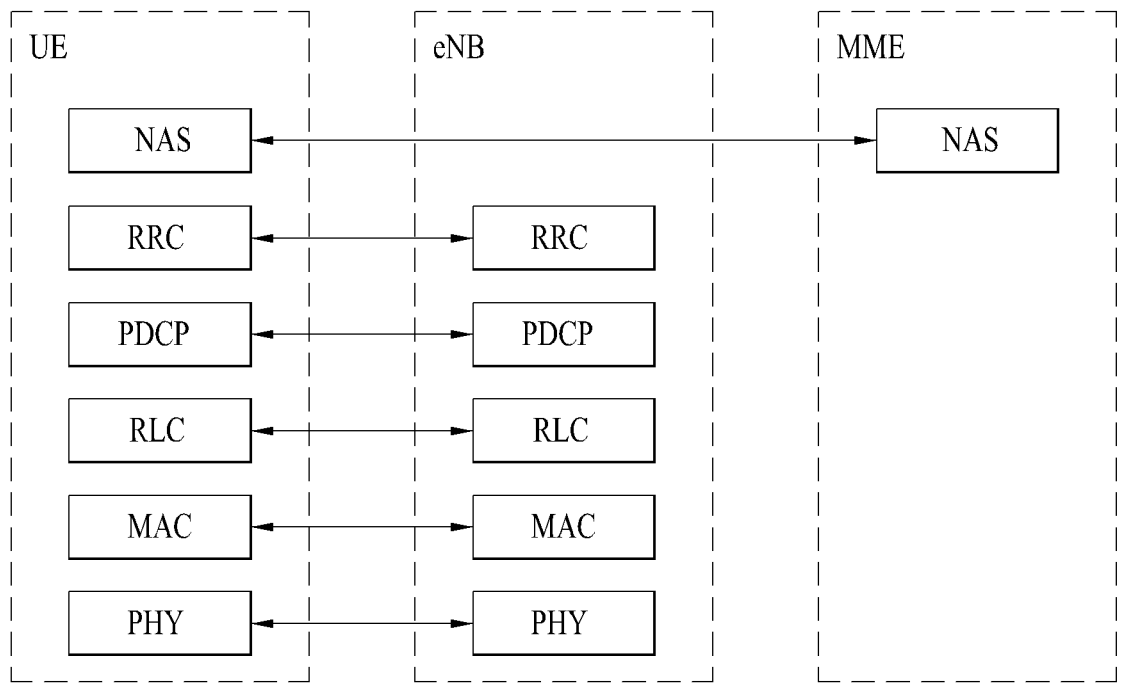
FIG. 1 is a diagram showing the structure of a control plane and a user plane of a radio interface protocol between a terminal and an E-UTRAN based on the 3GPP radio access network standard
Figure 1:
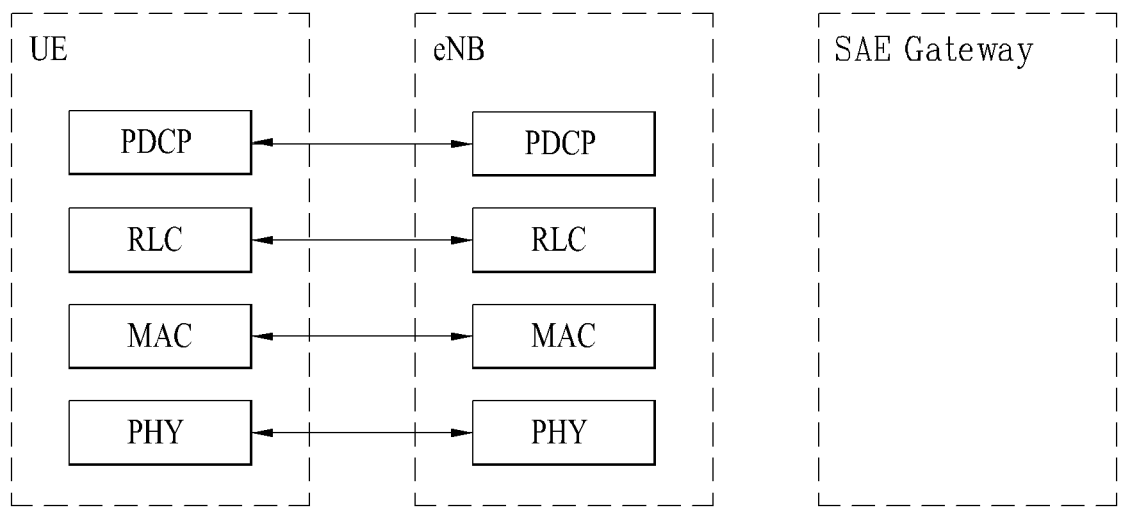

The configuration, operation, and other features of the present disclosure will readily be understood with embodiments of the present disclosure described with reference to the attached drawings. Embodiments of the present disclosure as set forth herein are examples in which the technical features of the present disclosure are applied to a 3rd generation partnership project (3GPP) system.

While embodiments of the present disclosure are described in the context of long term evolution (LTE) and LTE-advanced (LTE-A) systems, they are purely exemplary. Therefore, the embodiments of the present disclosure are applicable to any other communication system as long as the above definitions are valid for the communication system.

The term, base station (BS) may be used to cover the meanings of terms including remote radio head (RRH), evolved Node B (eNB or eNode B), transmission point (TP), reception point (RP), relay, and so on.

The 3GPP communication standards define downlink (DL) physical channels corresponding to resource elements (REs) carrying information originated from a higher layer, and DL physical signals which are used in the physical layer and correspond to REs which do not carry information originated from a higher layer. For example, physical downlink shared channel (PDSCH), physical broadcast channel (PBCH), physical multicast channel (PMCH), physical control format indicator channel (PCFICH), physical downlink control channel (PDCCH), and physical hybrid ARQ indicator channel (PHICH) are defined as DL physical channels, and reference signals (RSs) and synchronization signals (SSs) are defined as DL physical signals. An RS, also called a pilot signal, is a signal with a predefined special waveform known to both a gNode B (gNB) and a user equipment (UE). For example, cell specific RS, UE-specific RS (UE-RS), positioning RS (PRS), and channel state information RS (CSI-RS) are defined as DL RSs. The 3GPP LTE/LTE-A standards define uplink (UL) physical channels corresponding to REs carrying information originated from a higher layer, and UL physical signals which are used in the physical layer and correspond to REs which do not carry information originated from a higher layer. For example, physical uplink shared channel (PUSCH), physical uplink control channel (PUCCH), and physical random access channel (PRACH) are defined as UL physical channels, and a demodulation reference signal (DMRS) for a UL control/data signal, and a sounding reference signal (SRS) used for UL channel measurement are defined as UL physical signals.

In the present disclosure, the PDCCH/PCFICH/PHICH/PDSCH refers to a set of time-frequency resources or a set of REs, which carry downlink control information (DCI)/a control format indicator (CFI)/a DL acknowledgement/negative acknowledgement (ACK/NACK)/DL data. Further, the PUCCH/PUSCH/PRACH refers to a set of time-frequency resources or a set of REs, which carry UL control information (UCI)/UL data/a random access signal. In the present disclosure, particularly a time-frequency resource or an RE which is allocated to or belongs to the PDCCH/PCFICH/PHICH/PDSCH/PUCCH/PUSCH/PRACH is referred to as a PDCCH RE/PCFICH RE/PHICH RE/PDSCH RE/PUCCH RE/PUSCH RE/PRACH RE or a PDCCH resource/PCFICH resource/PHICH resource/PDSCH resource/PUCCH resource/PUSCH resource/PRACH resource. Hereinafter, if it is said that a UE transmits a PUCCH/PUSCH/PRACH, this means that UCI/UL data/a random access signal is transmitted on or through the PUCCH/PUSCH/PRACH. Further, if it is said that a gNB transmits a PDCCH/PCFICH/PHICH/PDSCH, this means that DCI/control information is transmitted on or through the PDCCH/PCFICH/PHICH/PDSCH.

Hereinafter, an orthogonal frequency division multiplexing (OFDM) symbol/carrier/subcarrier/RE to which a CRS/DMRS/CSI-RS/SRS/UE-RS is allocated to or for which the CRS/DMRS/CSI-RS/SRS/UE-RS is configured is referred to as a CRS/DMRS/CSI-RS/SRS/UE-RS symbol/carrier/subcarrier/RE. For example, an OFDM symbol to which a tracking RS (TRS) is allocated or for which the TRS is configured is referred to as a TRS symbol, a subcarrier to which a TRS is allocated or for which the TRS is configured is referred to as a TRS subcarrier, and an RE to which a TRS is allocated or for which the TRS is configured is referred to as a TRS RE. Further, a subframe configured to transmit a TRS is referred to as a TRS subframe. Further, a subframe carrying a broadcast signal is referred to as a broadcast subframe or a PBCH subframe, and a subframe carrying a synchronization signal (SS) (e.g., a primary synchronization signal (PSS) and/or a secondary synchronization signal (SSS)) is referred to as an SS subframe or a PSS/SSS subframe. An OFDM symbol/subcarrier/RE to which a PSS/SSS is allocated or for which the PSS/SSS is configured is referred to as a PSS/SSS symbol/subcarrier/RE.

In the present disclosure, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna port configured to transmit CRSs may be distinguished from each other by the positions of REs occupied by the CRSs according to CRS ports, antenna ports configured to transmit UE-RSs may be distinguished from each other by the positions of REs occupied by the UE-RSs according to UE-RS ports, and antenna ports configured to transmit CSI-RSs may be distinguished from each other by the positions of REs occupied by the CSI-RSs according to CSI-RS ports. Therefore, the term CRS/UE-RS/CSI-RS/TRS port is also used to refer to a pattern of REs occupied by a CRS/UE-RS/CSI-RS/TRS in a predetermined resource area.

5G communication involving a new radio access technology (NR) system will be described below.

Three key requirement areas of 5G are (1) enhanced mobile broadband (eMBB), (2) massive machine type communication (mMTC), and (3) ultra-reliable and low latency communications (URLLC).

Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is AR for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases in a 5G communication system including the NR system will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup can be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G.

Finally, logistics and freight tracking are important use cases for mobile communications that enable the tracking of inventory and packages wherever they are by using location-based information systems. The logistics and freight tracking use cases typically require lower data rates but need wide coverage and reliable location information.

FIG. 1 illustrates control-plane and user-plane protocol stacks in a radio interface protocol architecture conforming to a 3GPP wireless access network standard between a UE and an evolved UMTS terrestrial radio access network (E-UTRAN). The control plane is a path in which the UE and the E-UTRAN transmit control messages to manage calls, and the user plane is a path in which data generated from an application layer, for example, voice data or Internet packet data is transmitted.

A physical (PHY) layer at layer 1 (L1) provides information transfer service to its higher layer, a medium access control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in orthogonal frequency division multiple access (OFDMA) for downlink (DL) and in single carrier frequency division multiple access (SC-FDMA) for uplink (UL).

The MAC layer at layer 2 (L2) provides service to its higher layer, a radio link control (RLC) layer via logical channels. The RLC layer at L2 supports reliable data transmission. RLC functionality may be implemented in a function block of the MAC layer. A packet data convergence protocol (PDCP) layer at L2 performs header compression to reduce the amount of unnecessary control information and thus efficiently transmit Internet protocol (IP) packets such as IP version 4 (IPv4) or IP version 6 (IPv6) packets via an air interface having a narrow bandwidth.

A radio resource control (RRC) layer at the lowest part of layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a broadcast channel (BCH) carrying system information, a paging channel (PCH) carrying a paging message, and a shared channel (SCH) carrying user traffic or a control message. DL multicast traffic or control messages or DL broadcast traffic or control messages may be transmitted on a DL SCH or a separately defined DL multicast channel (MCH). UL transport channels used to deliver data from a UE to the E-UTRAN include a random access channel (RACH) carrying an initial control message and a UL SCH carrying user traffic or a control message. Logical channels that are defined above transport channels and mapped to the transport channels include a broadcast control channel (BCCH), a paging control channel (PCCH), a Common Control Channel (CCCH), a multicast control channel (MCCH), a multicast traffic channel (MTCH), etc.

Figure 2:
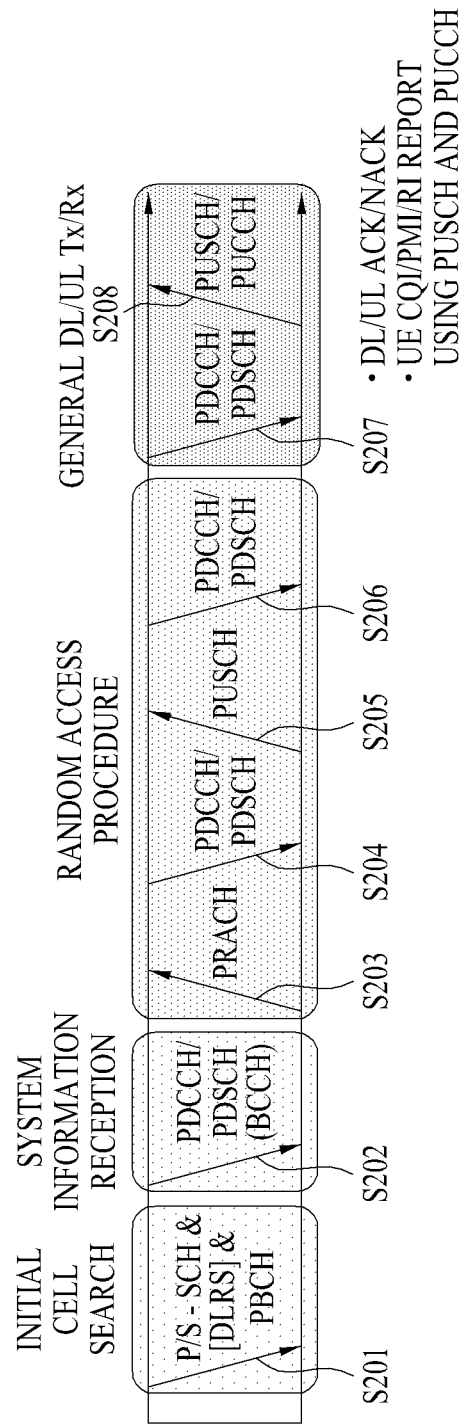
FIG. 2 is a diagram illustrating physical channels used in a 3GPP system and a general signal transmission method using them.

FIG. 2 illustrates physical channels and a general method for transmitting signals on the physical channels in the 3GPP system.

Referring to FIG. 2, when a UE is powered on or enters a new cell, the UE performs initial cell search (S201). The initial cell search involves acquisition of synchronization to an eNB. Specifically, the UE synchronizes its timing to the eNB and acquires a cell identifier (ID) and other information by receiving a primary synchronization channel (P-SCH) and a secondary synchronization channel (S-SCH) from the eNB. Then the UE may acquire information broadcast in the cell by receiving a physical broadcast channel (PBCH) from the eNB. During the initial cell search, the UE may monitor a DL channel state by receiving a downlink reference signal (DL RS).

After the initial cell search, the UE may acquire detailed system information by receiving a physical downlink control channel (PDCCH) and receiving a physical downlink shared channel (PDSCH) based on information included in the PDCCH (S202).

If the UE initially accesses the eNB or has no radio resources for signal transmission to the eNB, the UE may perform a random access procedure with the eNB (S203 to S206). In the random access procedure, the UE may transmit a predetermined sequence as a preamble on a physical random access channel (PRACH) (S203 and S205) and may receive a response message to the preamble on a PDCCH and a PDSCH associated with the PDCCH (S204 and S206). In the case of a contention-based RACH, the UE may additionally perform a contention resolution procedure.

After the above procedure, the UE may receive a PDCCH and/or a PDSCH from the eNB (S207) and transmit a physical uplink shared channel (PUSCH) and/or a physical uplink control channel (PUCCH) to the eNB (S208), which is a general DL and UL signal transmission procedure. Particularly, the UE receives downlink control information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL acknowledgment/negative acknowledgment (ACK/NACK) signal, a channel quality indicator (CQI), a precoding matrix index (PMI), a rank indicator (RI), etc. In the 3GPP LTE system, the UE may transmit control information such as a CQI, a PMI, an RI, etc. on a PUSCH and/or a PUCCH.

The use of an ultra-high frequency band, that is, a millimeter frequency band at or above 6 GHz is under consideration in the NR system to transmit data in a wide frequency band, while maintaining a high transmission rate for multiple users. The 3GPP calls this system NR. In the present disclosure, the system will also be referred to as an NR system.

The NR system adopts the OFDM transmission scheme or a similar transmission scheme. Specifically, the NR system may use OFDM parameters different from those in LTE. Further, the NR system may follow the legacy LTE/LTE-A numerology but have a larger system bandwidth (e.g., 100 MHz). Further, one cell may support a plurality of numerologies in the NR system. That is, UEs operating with different numerologies may coexist within one cell.

Figure 3:
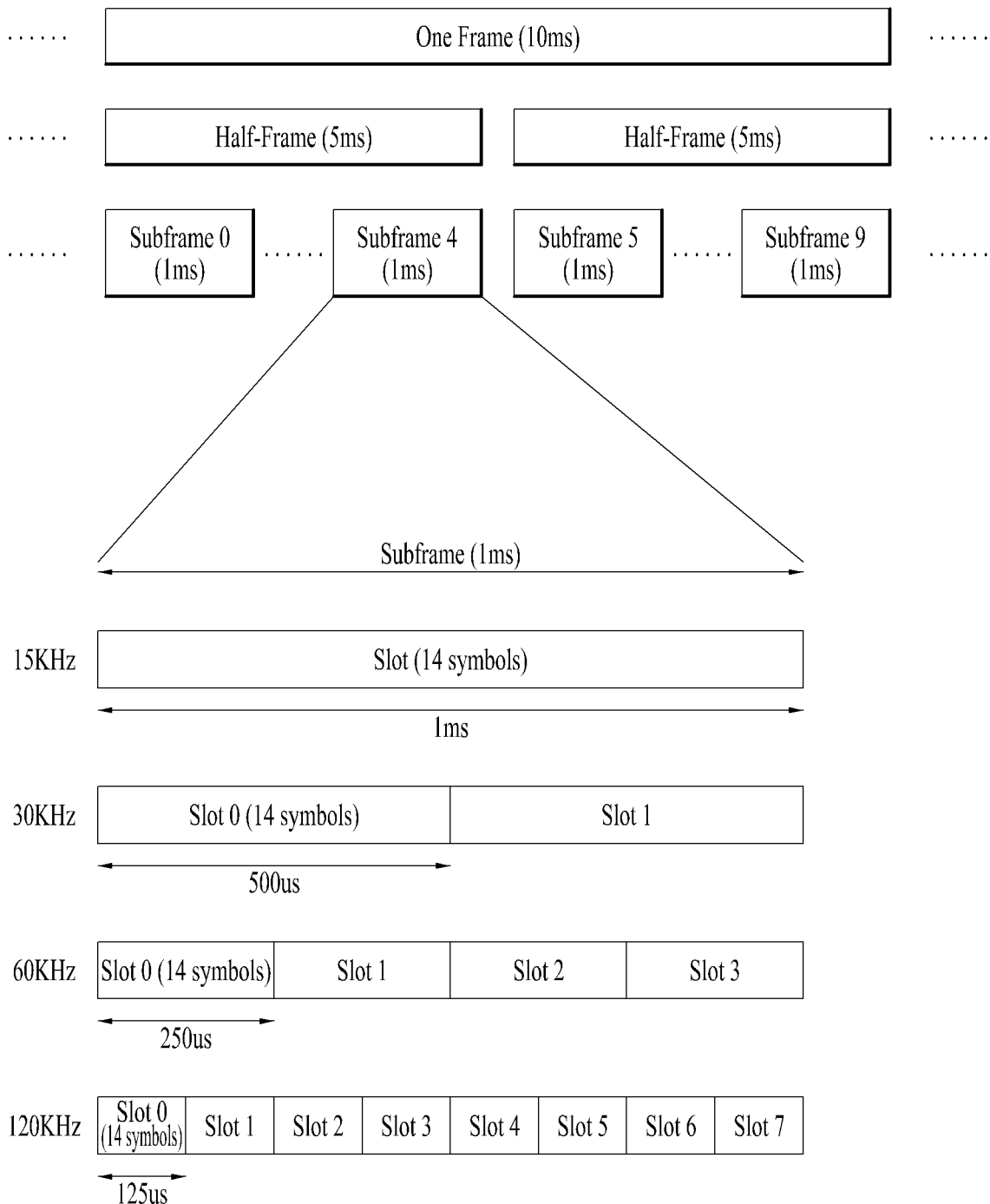
FIGS. 3 to 5 are diagrams for explaining the structure of a radio frame and a slot used in an NR system.

FIG. 3 illustrates a structure of a radio frame used in NR.

In NR, UL and DL transmissions are configured in frames. The radio frame has a length of 10 ms and is defined as two 5-ms half-frames (HF). The half-frame is defined as five 1 ms subframes (SF). A subframe is divided into one or more slots, and the number of slots in a subframe depends on subcarrier spacing (SCS). Each slot includes 12 or 14 OFDM(A) symbols according to a cyclic prefix (CP). When a normal CP is used, each slot includes 14 symbols. When an extended CP is used, each slot includes 12 symbols. Here, the symbols may include OFDM symbols (or CP-OFDM symbols) and SC-FDMA symbols (or DFT-s-OFDM symbols).

Table 1 illustrates that the number of symbols per slot, the number of slots per frame, and the number of slots per subframe vary according to the SCS when the normal CP is used.

TABLE 1

| SCS (15*2^u) | $N_{symb}^{slot}$ | $N_{slot}^{frame,u}$ | $N_{slot}^{subframe,u}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

$N^{slot}_{symb}$: Number of symbols in a slot*$N^{frame,u}_{slot}$: Number of slots in a frame $N^{subframe,u}_{slot}$: Number of slots in a subframe Table 2 illustrates that the number of symbols per slot, number of slots per frame, and the number of slots per subframe vary according to the SCS when the extended CP is used.

TABLE 2

| SCS (15*2^u) | $N_{symb}^{slot}$ | $N_{slot}^{frame,u}$ | $N_{slot}^{subframe,u}$ |
|---|---|---|---|
| 60 KHz (u = 2) | 12 | 40 | 4 |

In the NR system, the OFDM(A) numerology (e.g., SCS, CP length, etc.) may be configured differently among a plurality of cells merged for one UE. Thus, the (absolute time) duration of a time resource (e.g., SF, slot or TTI) (referred to as a time unit (TU) for simplicity) composed of the same number of symbols may be set differently among the merged cells.

Figure 4:
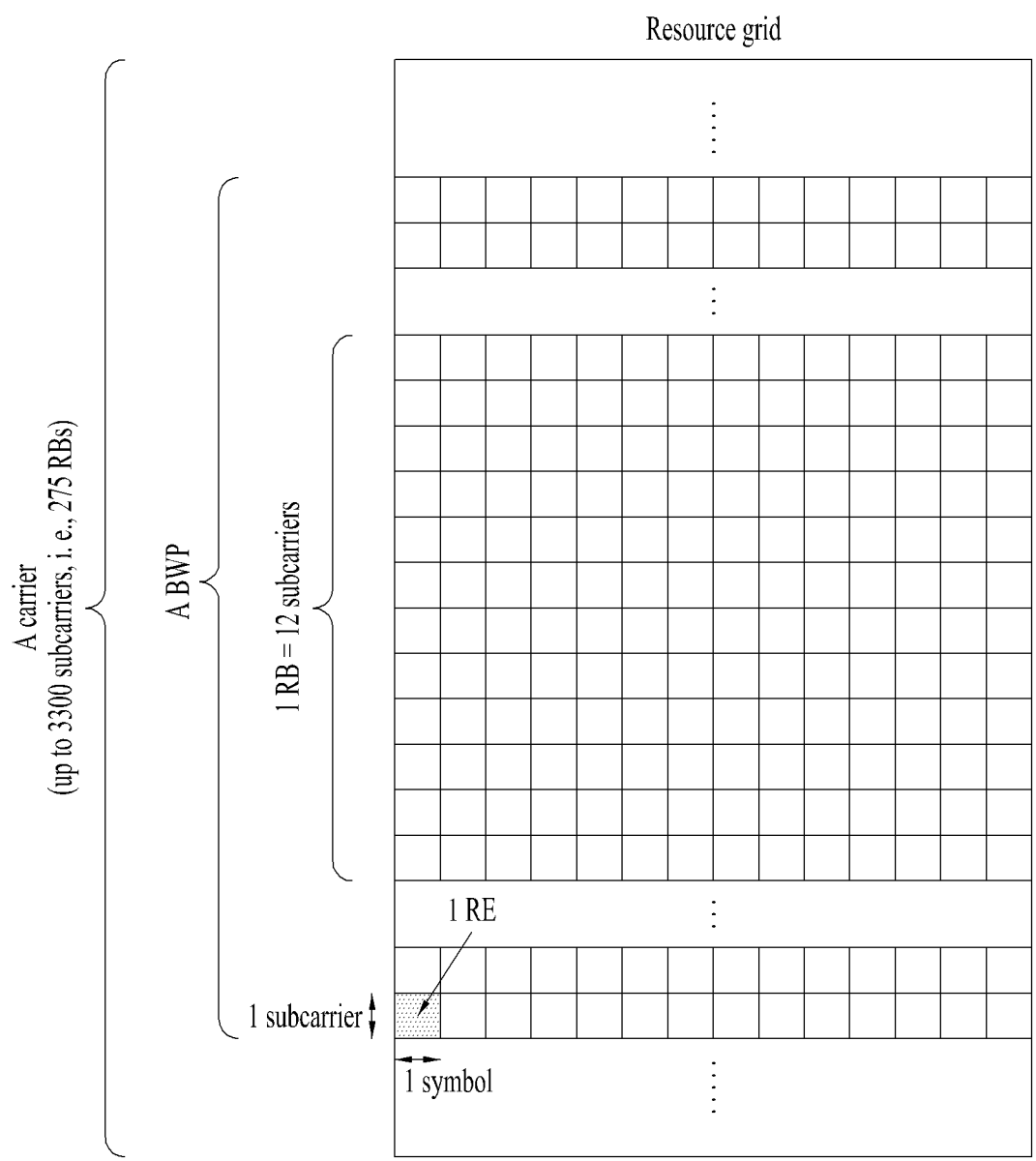

FIG. 4 illustrates a slot structure of an NR frame. A slot includes a plurality of symbols in the time domain. For example, in the case of the normal CP, one slot includes seven symbols. On the other hand, in the case of the extended CP, one slot includes six symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) is defined as a plurality of consecutive (P)RBs in the frequency domain and may correspond to one numerology (e.g., SCS, CP length, etc.). A carrier may include up to N (e.g., 4) BWPs. Data communication is performed through an activated BWP, and only one BWP may be activated for one UE. In the resource grid, each element is referred to as a resource element (RE), and one complex symbol may be mapped thereto.

Figure 5:
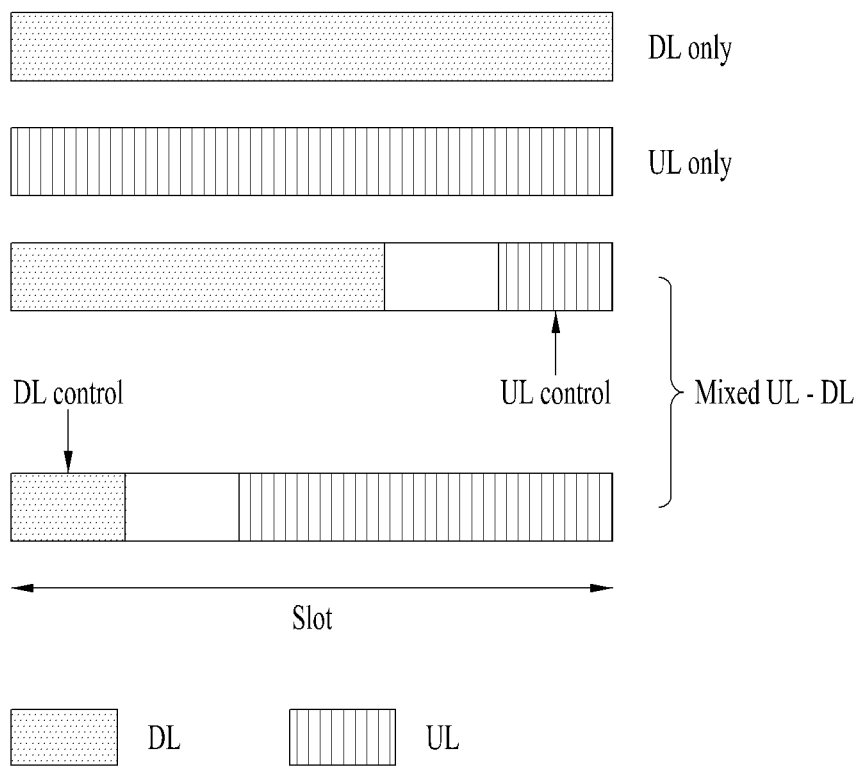

FIG. 5 illustrates a structure of a self-contained slot. In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

1. DL only configuration
2. UL only configuration
3. Mixed UL-DL configuration
   DL region+Guard period (GP)+UL control region
   DL control region+GP+UL region
   DL region: (i) DL data region, (ii) DL control region+DL data region
   UL region: (i) UL data region, (ii) UL data region+UL control region The PDCCH may be transmitted in the DL control region, and the PDSCH may be transmitted in the DL data region. The PUCCH may be transmitted in the UL control region, and the PUSCH may be transmitted in the UL data region. Downlink control information (DCI), for example, DL data scheduling information, UL data scheduling information, and the like, may be transmitted on the PDCCH. Uplink control information (UCI), for example, ACK/NACK information about DL data, channel state information (CSI), and a scheduling request (SR), may be transmitted on the PUCCH. The GP provides a time gap in the process of the UE switching from the transmission mode to the reception mode or from the reception mode to the transmission mode. Some symbols at the time of switching from DL to UL within a subframe may be configured as the GP.

Figure 6:
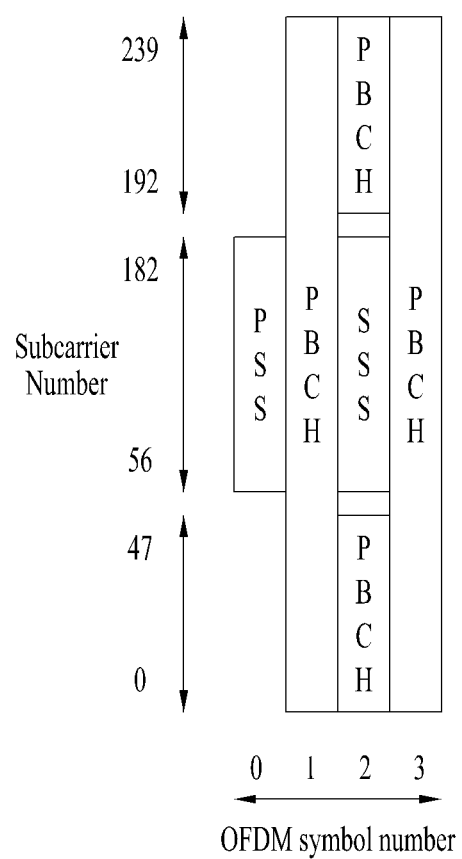
FIGS. 6 and 7 are diagrams for explaining a structure and a transmission method of a Synchronization Signal Block (SSB).

FIG. 6 illustrates an SSB structure. The UE may perform cell search, system information acquisition, beam alignment for initial access, DL measurement, and so on based on an SSB. The term SSB is used interchangeably with synchronization signal/physical broadcast channel (SS/PBCH) block.

Referring to FIG. 6, an SSB is composed of a PSS, an SSS, and a PBCH. The SSB includes four consecutive OFDM symbols. The PSS, the PBCH, the SSS/PBCH, and the PBCH are transmitted on the respective OFDM symbols. Each of the PSS and the SSS includes one OFDM symbol and 127 subcarriers, and the PBCH includes 3 OFDM symbols and 576 subcarriers. Polar coding and quadrature phase shift keying (QPSK) are applied to the PBCH. The PBCH includes data REs and demodulation reference signal (DMRS) REs in each OFDM symbol. There are three DMRS REs per RB, with three data REs between every two adjacent DMRS REs.

The cell search refers to a procedure in which the UE obtains time/frequency synchronization of a cell and detects a cell ID (e.g., physical layer cell ID (PCID)) of the cell. The PSS may be used in detecting a cell ID within a cell ID group, and the SSS may be used in detecting a cell ID group. The PBCH may be used in detecting an SSB (time) index and a half-frame.

The cell search procedure of the UE may be summarized as described in Table 3 below.

TABLE 3

| | Type of Signals | Operations |
|---|---|---|
| $1^{st}$ step | PSS | SS/PBCH block (SSB) symbol timing acquisition Cell ID detection within a cell ID group (3 hypothesis) |
| $2^{nd}$ Step | SSS | Cell ID group detection (336 hypothesis) |
| $3^{rd}$ Step | PBCH DMRS | SSB index and Half frame (HF) index (Slot and frame boundary detection) |
| $4^{th}$ Step | PBCH | Time information (80 ms, System Frame Number (SFN), SSB index, HF) Remaining Minimum System Information (RMSI) Control resource set (CORESET)/ Search space configuration |
| $5^{th}$ Step | PDCCH and PDSCH | Cell access information RACH configuration |

There may be 336 cell ID groups, and each cell ID group may have three cell IDs. There may be 1008 cell IDs in total. Information about a cell ID group to which a cell ID of a cell belongs may be provided/obtained through the SSS of the cell, and information about the cell ID among 336 cells in the cell ID may be provided/obtained through the PSS.

Figure 7:
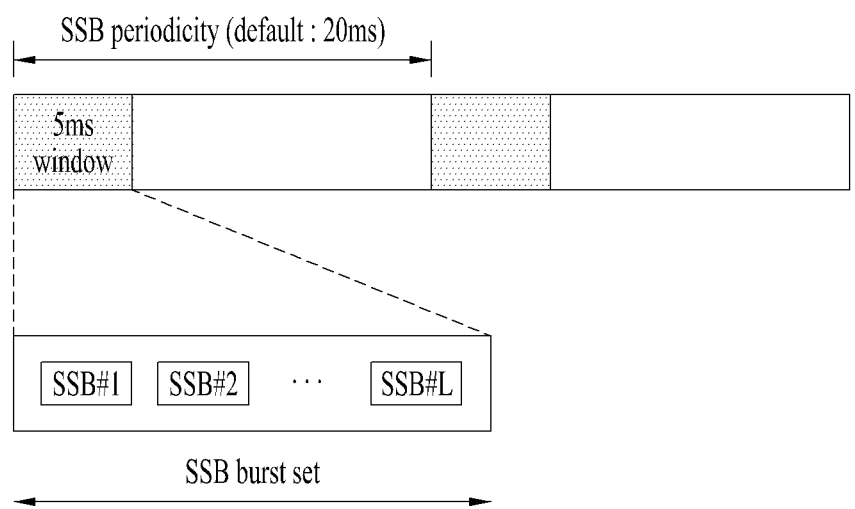

FIG. 7 illustrates SSB transmission. Referring to FIG. 7, an SSB is periodically transmitted according to the SSB periodicity. The basic SSB periodicity assumed by the UE in the initial cell search is defined as 20 ms. After the cell access, the SSB periodicity may be set to one of {5 ms, 10 ms, 20 ms, 40 ms, 80 ms, 160 ms} by the network (e.g., the BS). An SSB burst set may be configured at the beginning of an SSB period. The SSB burst set may be configured with a 5-ms time window (i.e., half-frame), and an SSB may be repeatedly transmitted up to L times within the SS burst set. The maximum number of transmissions of the SSB, L may be given according to the frequency band of a carrier as follows. One slot includes up to two SSBs.

For frequency range up to 3 GHz, L=4
For frequency range from 3 GHz to 6 GHz, L=8
For frequency range from 6 GHz to 52.6 GHz, L=64

The time position of an SSB candidate in the SS burst set may be defined according to the SCS as follows. The time positions of SSB candidates are indexed as (SSB indexes) 0 to L−1 in temporal order within the SSB burst set (i.e., half-frame).

Case A—15-kHz SCS: The indexes of the first symbols of candidate SSBs are given as {2, 8}+14*n where n=0, 1 for a carrier frequency equal to or lower than 3 GHz, and n=0, 1, 2, 3 for a carrier frequency of 3 GHz to 6 GHz.

Case B—30-kHz SCS: The indexes of the first symbols of candidate SSBs are given as {4, 8, 16, 20}+28*n where n=0 for a carrier frequency equal to or lower than 3 GHz, and n=0, 1 for a carrier frequency of 3 GHz to 6 GHz.

Case C—30-kHz SCS: The indexes of the first symbols of candidate SSBs are given as {2, 8}+14*n where n=0, 1 for a carrier frequency equal to or lower than 3 GHz, and n=0, 1, 2, 3 for a carrier frequency of 3 GHz to 6 GHz.

Case D—120-kHz SCS: The indexes of the first symbols of candidate SSBs are given as {4, 8, 16, 20}+28*n where n=0, 1, 2, 3, 5, 6, 7, 8, 10, 11, 12, 13, 15, 16, 17, 18 for a carrier frequency above 6 GHz.

Case E—240-kHz SCS: The indexes of the first symbols of candidate SSBs are given as {8, 12, 16, 20, 32, 36, 40, 44}+56*n where n=0, 1, 2, 3, 5, 6, 7, 8 for a carrier frequency above 6 GHz CSI-Related Operations In the NR system, a CSI-RS is used for time/frequency tracking, CSI computation, reference signal received power (RSRP) calculation, and mobility. CSI computation is related to CSI acquisition, and RSRP computation is related to beam management (BM).

Figure 8:
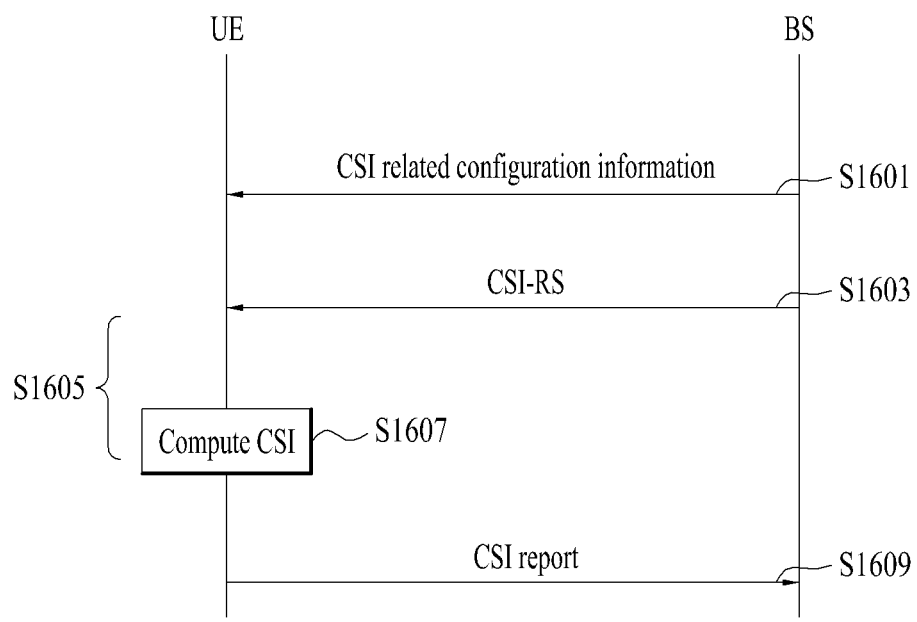
FIG. 8 is a diagram for describing a process of reporting Channel State Information (CSI).

FIG. 8 is a diagram illustrating a signal flow for a CSI-related process.

For one of the above-described uses of the CSI-RS, a UE receives CSI-related configuration information from a BS by RRC signaling (S1601).

The CSI-related configuration information may include at least one of channel state information interference measurement (CSI-IM) resource-related information, CSI measurement configuration-related information, CSI resource configuration-related information, CSI-RS resource-related information, or CSI report configuration-related information.

i) The CSI-IM resource-related information may include CSI-IM resource information, CSI-IM resource set information, and so on. A CSI-IM resource set is identified by a CSI-IM resource set ID, and one CSI-IM resource set includes at least one CSI-IM resource. Each CSI-IM resource is identified by a CSI-IM resource ID.

ii) The CSI resource configuration-related information may be represented by a CSI-ResourceConfig information element (IE). The CSI resource configuration-related information defines a group including at least one of a non-zero power (NZP) CSI-RS resource set, a CSI-IM resource set, or a CSI-SSB resource set. That is, the CSI resource configuration-related information may include a CSI-RS resource set list, and the CSI-RS resource set list may include at least one of an NZP CSI-RS resource set list, a CSI-IM resource set list, or a CSI-SSB resource set list. The CSI-RS resource set is identified by a CSI-RS resource set ID, and one CSI-RS resource set includes at least one CSI-RS resource. Each CSI-RS resource is identified by a CSI-RS resource ID.

An RRC parameter indicating the use of a CSI-RS (e.g., a BM-related parameter 'repetition' and a tracking-related parameter 'trs-Info') may be configured for each NZP CSI-RS resource set.

iii) The CSI report configuration-related information includes a parameter indicating a time-domain behavior, reportConfigType and a parameter indicating a CSI-related quantity to be reported, reportQuantity. The time-domain behavior may be periodic, aperiodic, or semi-persistent.

The UE measures CSI based on the CSI-related configuration information (S1605). The CSI measurement may include (1) CSI-RS reception of the UE (S1603) and (2) CSI computation in the received CSI-RS (S1607). Mapping of the CSI-RS to REs of CSI-RS resources in the time and frequency domains is configured by an RRC parameter, CSI-RS-ResourceMapping.

The UE reports the measured CSI to the BS (S1609).

1. CSI Measurement

The NR system supports more flexible and more dynamic CSI measurement and reporting. The CSI measurement may include reception of a CSI-RS and measurement of the received CSI-RS to acquire CSI.

As the time-domain behavior of CSI measurement and reporting, channel measurement (CM) and interference measurement (IM) are supported.

A CSI-IM-based IM resource (IMR) is designed in NR, similarly to a CSI-IM in LTE and configured independently of a zero power (ZP) CSI-RS resource for PDSCH rate matching.

The BS transmits an NZP CSI-RS to the UE on each port of a configured NZP CSI-RS-based IMR.

When there is no PMI and RI feedback for a channel, multiple resources are configured in a set, and the BS or network indicates a subset of NZP CSI-RS resources for channel measurement and/or interference measurement by DCI.

A resource setting and a resource setting configuration will be described in greater detail.

1. 1. Resource Setting

Each CSI resource setting 'CSI-ResourceConfig' includes a configuration of S≥1 CSI resource sets (given by an RRC parameter csi-RS-ResourceSetList). S represents the number of configured CSI-RS resource sets. The configuration of S≥1 CSI resource sets includes each CSI resource set including (NZP CSI-RS or CSI-IM) CSI-RS resources, and SSB resources used for RSRP computation.

Each CSI resource setting is located in a DL BWP identified by an RRC parameter bwp-id. All CSI resource settings linked to a CSI reporting setting have the same DL BWP.

The time-domain behavior of a CSI-RS resource within the CSI-ResourceConfig IE is indicated by an RRC parameter resourceType in the CSI resource setting, and may be set to aperiodic, periodic, or semi-persistent.

One or more CSI resource settings for channel measurement and interference measurement are configured by RRC signaling. A channel measurement resource (CMR) may be an NZP CSI-RS for CSI acquisition, and an IMR may be an NZP CSI-RS for CSI-IM and IM. The CSI-IM (or ZP CSI-RS for IM) is mainly used for inter-cell measurement. The NZP CSI-RS for IM is used mainly for measurement of intra-cell interference from multiple users.

The UE may assume that CSI-RS resource(s) for channel measurement and CSI-IM/NZP CSI-RS resource(s) for interference measurement configured for one CSI report are resource-wise quasi co-located (QCLed) with respect to 'QCL-TypeD'.

1. 2. Resource Setting Configuration

A resource setting may mean a resource set list, and one reporting setting may be linked to up to three resource settings.

When one resource setting is configured, the resource setting (given by an RRC parameter resourcesForChannelMeasurement) is for channel measurement for RSRP computation.

When two resource settings are configured, the first resource setting (given by the RRC parameter resourcesForChannelMeasurement) is for channel measurement and the second resource setting (given by csi-IM-ResourcesForInterference or nzp-CSI-RS-ResourcesForInterference) is for interference measurement on the CSI-IM or on the NZP CSI-RS.

When three resource settings are configured, the first resource setting (given by resourcesForChannelMeasurement) is for channel measurement, the second resource setting (given by csi-IM-ResourcesForInterference) is for CSI-IM-based interference measurement, and the third resource setting (given by nzp-CSI-RS-ResourcesForInterference) is for NZP CSI-RS-based interference measurement.

When one resource setting (given by resourcesForChannelMeasurement) is configured, the resource setting is for channel measurement for RSRP computation.

When two resource settings are configured, the first resource setting (given by resourcesForChannelMeasurement) is for channel measurement and the second resource setting (given by the RRC parameter csi-IM-ResourcesForInterference) is used for interference measurement performed on the CSI-IM.

1. 3. CSI Computation

If interference measurement is performed on the CSI-IM, each CSI-RS resource for channel measurement is resource-wise associated with a CSI-IM resource by the ordering of the CSI-RS resources and CSI-IM resources in a corresponding resource set. The number of CSI-RS resources for channel measurement equals to the number of CSI-IM resources.

For CSI measurement, the UE assumes the following.

Each NZP CSI-RS port configured for interference measurement corresponds to an interference transmission layer.

All interference transmission layers on NZP CSI-RS ports for interference measurement take into account energy per resource element (EPRE) ratios.

The UE assumes another interference signal on RE(s) of NZP CSI-RS resources for channel measurement, NZP CSI-RS resources for interference measurement, or CSI-IM resources for interference measurement.

2. CSI Reporting

Time and frequency resources available for the UE to report CSI are controlled by the BS.

For a CQI, a PMI, a CSI-RS resource indicator (CRI), an SSB resource indicator (SSBRI), a layer indicator (LI), an RI, and an RSRP, the UE receives RRC signaling including N≥1 CSI-ReportConfig reporting settings, M≥1 CSI-ResourceConfig resource settings, and one or two lists of trigger states (given by aperiodicTriggerStateList and semiPersistentOnPUSCH-TriggerStateList). Each trigger state in aperiodicTriggerStateList includes a list of associated CSI-ReportConfigs indicating resource set IDs for a channel and optionally for interference. Each trigger state in semiPersistentOnPUSCH-TriggerStateList contains one associated CSI-ReportConfig.

That is, the UE transmits a CSI report indicated by CSI-ReportConfigs associated with a corresponding CSI-RS resource setting to the BS. For example, the UE may report at least one of a CQI, a PMI, a CRI, an SSBRI, an LI, an RI, or an RSRP as indicated by CSI-ReportConfigs associated with the CSI resource setting. However, if CSI-ReportConfigs associated with the CSI resource setting indicates 'none', the UE may not report CSI or an RSRP associated with the CSI resource setting. The CSI resource setting may indicate resources for an SS/PBCH block.

Positioning Reference Signal (PRS) in LTE System

Positioning may refer to determining the geographical position and/or velocity of the UE based on measurement of radio signals. Location information may be requested by and reported to a client (e.g., an application) associated with the UE. The location information may also be requested by a client within or connected to a core network. The location information may be reported in standard formats such as cell-based or geographical coordinates, together with estimated errors of the position and velocity of the UE and/or a positioning method used for positioning.

For such positioning, a positioning reference signal (PRS) may be used. The PRS is a reference signal used to estimate the position of the UE. For example, in the LTE system, the PRS may be transmitted only in a DL subframe configured for PRS transmission (hereinafter, "positioning subframe"). If both a multimedia broadcast single frequency network (MBSFN) subframe and a non-MBSFN subframe are configured as positioning subframes, OFDM symbols of the MBSFN subframe should have the same cyclic prefix (CP) as symbols of subframe #0. If only the MBSFN subframe is configured as the positioning subframe within a cell, OFDM symbols configured for the PRS in the MBSFN subframe may have an extended CP.

The sequence of the PRS may be defined by [Equation 1] below.

$$r_{l,n_s}(m) = \frac{1}{\sqrt{2}}(1 - 2 \cdot c(2m)) + j\frac{1}{\sqrt{2}}(1 - 2 \cdot c(2m+1)), \quad \text{[Equation 1]}$$
$$m = 0, 1, \ldots, 2N_{RB}^{max,DL} - 1,$$

where $n_s$ denotes a slot number in a radio frame and 1 denotes an OFDM symbol number in a slot. $N_{RB}^{max,DL}$ is the largest value among DL bandwidth configurations, and is represented as an integer multiple of $N_{SC}^{RB}$. $N_{SC}^{RB}$ denotes the size of a resource block (RB) in the frequency domain, for example, 12 subcarriers.

c(i) denotes a pseudo-random sequence and may be initialized by Equation 2 below.

$$c_{init} = 2^{28} \cdot \lfloor N_{ID}^{PRS}/512 \rfloor + 2^{10} \cdot (7 \cdot (n_s+1)+l+1) \cdot (2 \cdot (N_{ID}^{PRS} \mod 512)+1) + 2 \cdot (N_{ID}^{PRS} \mod 512) + N_{CP} \quad \text{[Equation 2]}$$

Unless additionally configured by higher layers, $N_{ID}^{PRS}$ is equal to $N_{ID}^{cell}$, and $N_{CP}$ is 1 for a normal CP and 0 for an extended CP.

Figure 9:
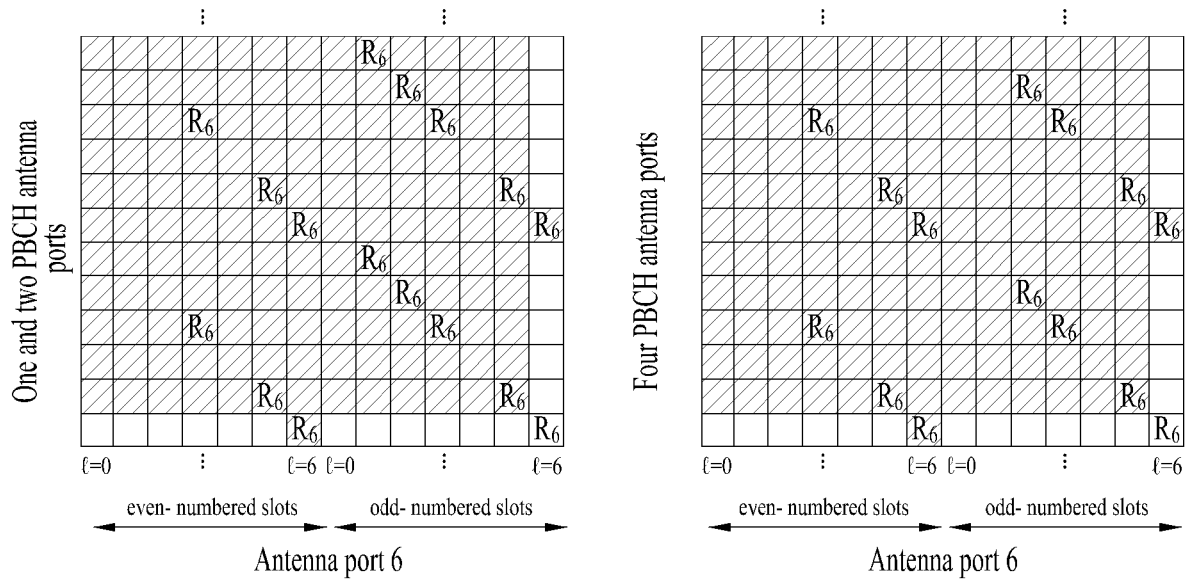
FIG. 9 shows an example in which a PRS (Positioning Reference Signal) is mapped in an LTE system.
Figure 9:
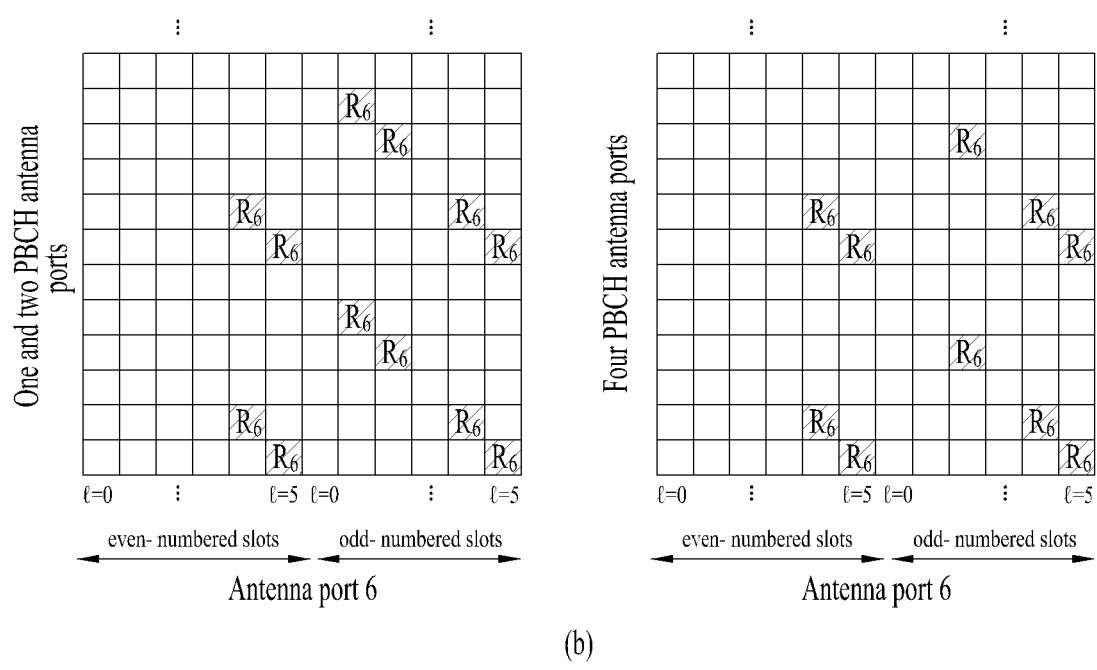

FIG. 9 illustrates an exemplary pattern to which a PRS is mapped in a subframe. As illustrated in FIG. 9, the PRS may be transmitted through an antenna port 6. FIG. 9(a) illustrates mapping of the PRS in the normal CP and FIG. 9(b) illustrates mapping of the PRS in the extended CP.

The PRS may be transmitted in consecutive subframes grouped for positioning. The subframes grouped for positioning are referred to as a positioning occasion. The positioning occasion may consist of 1, 2, 4 or 6 subframes. The positioning occasion may occur periodically at a periodicity of 160, 320, 640 or 1280 subframes. A cell-specific subframe offset value may be defined to indicate the starting subframe of PRS transmission. The offset value and the periodicity of the positioning occasion for PRS transmission may be derived from PRS configuration indexes as listed in Table 3 below.

TABLE 3

| PRS configuration Index ($I_{PRS}$) | PRS periodicity (subframes) | PRS subframe offset (subframes) |
|---|---|---|
| 0-159 | 160 | $I_{PRS}$ |
| 160-479 | 320 | $I_{PRS}$-160 |
| 480-1119 | 640 | $I_{PRS}$-480 |
| 1120-2399 | 1280 | $I_{PRS}$-1120 |
| 2400-2404 | 5 | $I_{PRS}$-2400 |
| 2405-2414 | 10 | $I_{PRS}$-2405 |
| 2415-2434 | 20 | $I_{PRS}$-2415 |
| 2435-2474 | 40 | $I_{PRS}$-2435 |
| 2475-2554 | 80 | $I_{PRS}$-2475 |
| 2555-4095 | Reserved | |

A PRS included in each positioning occasion is transmitted with constant power. A PRS in a certain positioning occasion may be transmitted with zero power, which is referred to as PRS muting. For example, when a PRS transmitted by a serving cell is muted, the UE may easily detect a PRS of a neighbor cell.

The PRS muting configuration of a cell may be defined by a periodic muting sequence consisting of 2, 4, 8 or 16 positioning occasions. That is, the periodic muting sequence may include 2, 4, 8, or 16 bits according to a positioning occasion corresponding to the PRS muting configuration and each bit may have a value "0" or "1". For example, PRS muting may be performed in a positioning occasion with a bit value of "0".

The positioning subframe is designed to have a low-interference subframe so that no data is transmitted in the positioning subframe. Therefore, the PRS is not subjected to interference due to data transmission although the PRS may interfere with PRSs of other cells.

UE Positioning Architecture in LTE System

Figure 10:
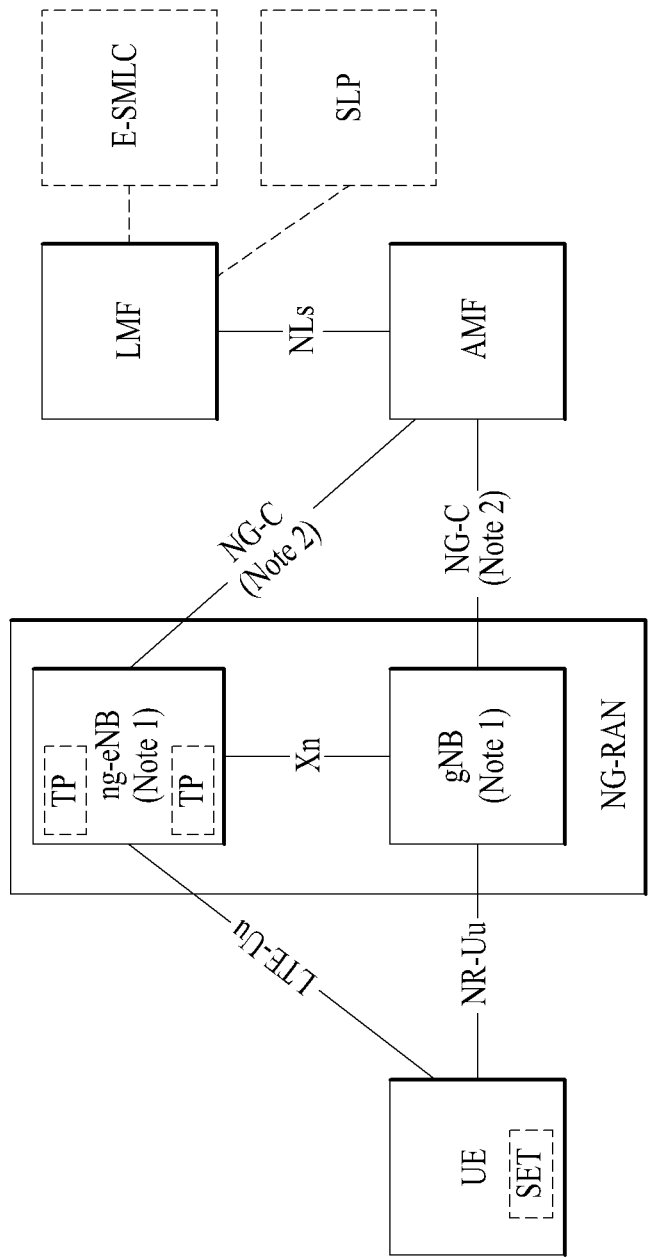
FIGS. 10 and 11 are views illustrating the architecture of a system for measuring the position of a UE and a procedure of measuring the position of the UE.

FIG. 10 illustrates the architecture of a 5G system applicable to positioning of a UE connected to a next generation-radio access network (NG-RAN) or an E-UTRAN.

Referring to FIG. 10, a core access and mobility management function (AMF) may receive a request for a location service associated with a particular target UE from another entity such as a gateway mobile location center (GMLC) or the AMF itself decides to initiate the location service on behalf of the particular target UE. Then, the AMF transmits a request for a location service to a location management function (LMF). Upon receiving the request for the location service, the LMF may process the request for the location service and then returns the processing result including the estimated position of the UE to the AMF. In the case of a location service requested by an entity such as the GMLC other than the AMF, the AMF may transmit the processing result received from the LMF to this entity.

A new generation evolved-NB (ng-eNB) and a gNB are network elements of the NG-RAN capable of providing a measurement result for positioning. The ng-eNB and the gNB may measure radio signals for a target UE and transmits a measurement result value to the LMF. The ng-eNB may control several transmission points (TPs), such as remote radio heads, or PRS-only TPs for support of a PRS-based beacon system for E-UTRA.

The LMF is connected to an enhanced serving mobile location center (E-SMLC) which may enable the LMF to access the E-UTRAN. For example, the E-SMLC may enable the LMF to support an observed time difference of arrival (OTDOA), which is one of positioning methods of the E-UTRAN, using DL measurement obtained by a target UE through signals transmitted by eNBs and/or PRS-only TPs in the E-UTRAN.

The LMF may be connected to an SUPL location platform (SLP). The LMF may support and manage different location services for target UEs. The LMF may interact with a serving ng-eNB or a serving gNB for a target UE in order to obtain positioning for the UE. For positioning of the target UE, the LMF may determine positioning methods, based on a location service (LCS) client type, required quality of service (QoS), UE positioning capabilities, gNB positioning capabilities, and ng-eNB positioning capabilities, and then apply these positioning methods to the serving gNB and/or serving ng-eNB. The LMF may determine additional information such as accuracy of the location estimate and velocity of the target UE. The SLP is a secure user plane location (SUPL) entity responsible for positioning over a user plane.

The UE may measure the position thereof using DL RSs transmitted by the NG-RAN and the E-UTRAN. The DL RSs transmitted by the NG-RAN and the E-UTRAN to the UE may include a SS/PBCH block, a CSI-RS, and/or a PRS. Which DL RS is used to measure the position of the UE may conform to configuration of LMF/E-SMLC/ng-eNB/E-UTRAN etc. The position of the UE may be measured by an RAT-independent scheme using different global navigation satellite systems (GNSSs), terrestrial beacon systems (TBSs), WLAN access points, Bluetooth beacons, and sensors (e.g., barometric sensors) installed in the UE. The UE may also contain LCS applications or access an LCS application through communication with a network accessed thereby or through another application contained therein. The LCS application may include measurement and calculation functions needed to determine the position of the UE. For example, the UE may contain an independent positioning function such as a global positioning system (GPS) and report the position thereof, independent of NG-RAN transmission. Such independently obtained positioning information may be used as assistance information of positioning information obtained from the network.

Operation for UE Positioning

Figure 11:
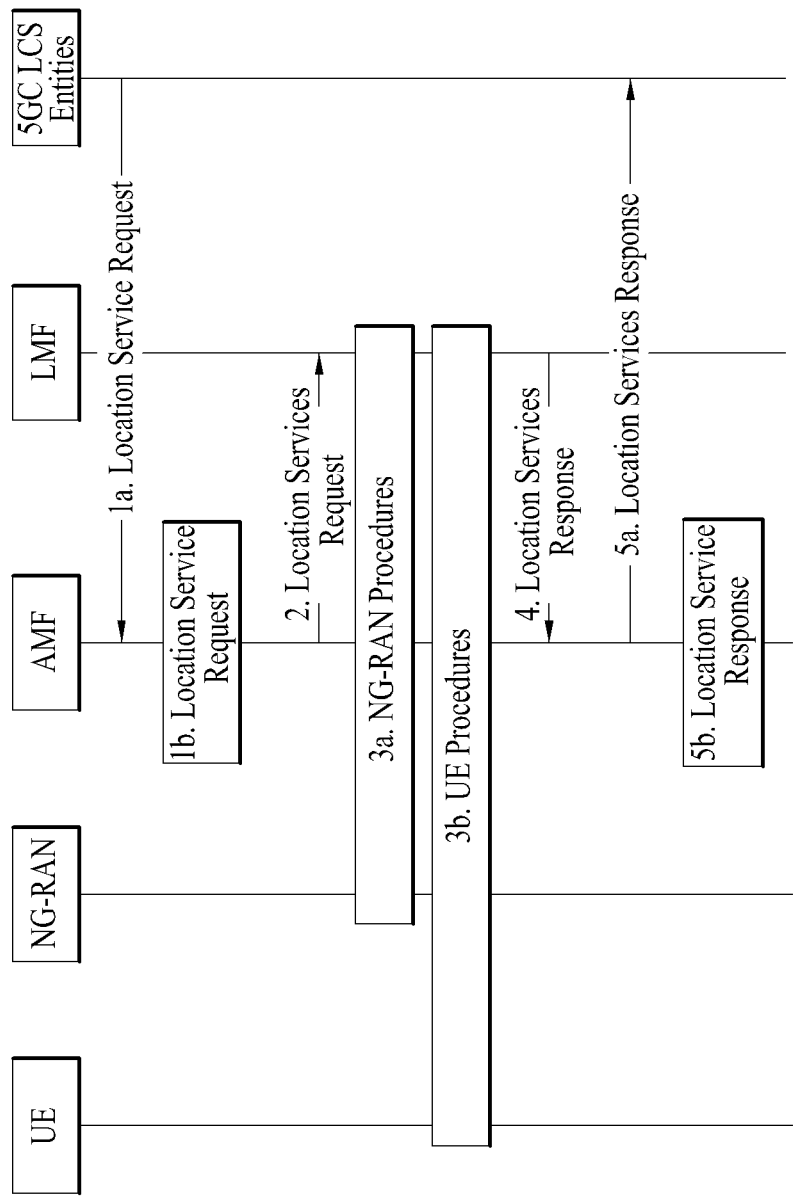

FIG. 11 illustrates an implementation example of a network for UE positioning. When an AMF receives a request for a location service in the case in which the UE is in connection management (CM)-IDLE state, the AMF may make a request for a network triggered service in order to establish a signaling connection with the UE and to assign a specific serving gNB or ng-eNB. This operation procedure is omitted in FIG. 11. In other words, in FIG. 11, it may be assumed that the UE is in a connected mode. However, the signaling connection may be released by an NG-RAN as a result of signaling and data inactivity while a positioning procedure is still ongoing.

An operation procedure of the network for UE positioning will now be described in detail with reference to FIG. 11. In step 1a, a 5GC entity such as GMLC may transmit a request for a location service for measuring the position of a target UE to a serving AMF. Here, even when the GMLC does not make the request for the location service, the serving AMF may determine the need for the location service for measuring the position of the target UE according to step 1b. For example, the serving AMF may determine that itself will perform the location service in order to measure the position of the UE for an emergency call.

In step 2, the AMF transfers the request for the location service to an LMF. In step 3a, the LMF may initiate location procedures with a serving ng-eNB or a serving gNB to obtain location measurement data or location measurement assistance data. For example, the LMF may transmit a request for location related information associated with one or more UEs to the NG-RAN and indicate the type of necessary location information and associated QoS. Then, the NG-RAN may transfer the location related information to the LMF in response to the request. In this case, when a location determination method according to the request is an enhanced cell ID (E-CID) scheme, the NG-RAN may transfer additional location related information to the LMF in one or more NR positioning protocol A (NRPPa) messages. Here, the "location related information" may mean all values used for location calculation such as actual location estimate information and radio measurement or location measurement. Protocol used in step 3a may be an NRPPa protocol which will be described later.

Additionally, in step 3b, the LMF may initiate a location procedure for DL positioning together with the UE. For example, the LMF may transmit the location assistance data to the UE or obtain a location estimate or location measurement value. For example, in step 3b, a capability information transfer procedure may be performed. Specifically, the LMF may transmit a request for capability information to the UE and the UE may transmit the capability information to the LMF. Here, the capability information may include information about a positioning method supportable by the LFM or the UE, information about various aspects of a particular positioning method, such as various types of assistance data for an A-GNSS, and information about common features not specific to any one positioning method, such as ability to handle multiple LPP transactions. In some cases, the UE may provide the capability information to the LMF although the LMF does not transmit a request for the capability information.

As another example, in step 3b, a location assistance data transfer procedure may be performed. Specifically, the UE may transmit a request for the location assistance data to the LMF and indicate particular location assistance data needed to the LMF. Then, the LMF may transfer corresponding location assistance data to the UE and transfer additional assistance data to the UE in one or more additional LTE positioning protocol (LPP) messages. The location assistance data delivered from the LMF to the UE may be transmitted in a unicast manner. In some cases, the LMF may transfer the location assistance data and/or the additional assistance data to the UE without receiving a request for the assistance data from the UE.

As another example, in step 3b, a location information transfer procedure may be performed. Specifically, the LMF may send a request for the location (related) information associated with the UE to the UE and indicate the type of necessary location information and associated QoS. In response to the request, the UE may transfer the location related information to the LMF. Additionally, the UE may transfer additional location related information to the LMF in one or more LPP messages. Here, the "location related information" may mean all values used for location calculation such as actual location estimate information and radio measurement or location measurement. Typically, the location related information may be a reference signal time difference (RSTD) value measured by the UE based on DL RSs transmitted to the UE by a plurality of NG-RANs and/or E-UTRANs. Similarly to the above description, the UE may transfer the location related information to the LMF without receiving a request from the LMF.

The procedures implemented in step 3b may be performed independently but may be performed consecutively. Generally, although step 3b is performed in order of the capability information transfer procedure, the location assistance data transfer procedure, and the location information transfer procedure, step 3b is not limited to such order. In other words, step 3b is not required to occur in specific order in order to improve flexibility in positioning. For example, the UE may request the location assistance data at any time in order to perform a previous request for location measurement made by the LMF. The LMF may also request location information, such as a location measurement value or a location estimate value, at any time, in the case in which location information transmitted by the UE does not satisfy required QoS. Similarly, when the UE does not perform measurement for location estimation, the UE may transmit the capability information to the LMF at any time.

In step 3b, when information or requests exchanged between the LMF and the UE are erroneous, an error message may be transmitted and received and an abort message for aborting positioning may be transmitted and received.

Protocol used in step 3b may be an LPP protocol which will be described later.

Step 3b may be performed additionally after step 3a but may be performed instead of step 3a.

In step 4, the LMF may provide a location service response to the AMF. The location service response may include information as to whether UE positioning is successful and include a location estimate value of the UE. If the procedure of FIG. 8 has been initiated by step 1a, the AMF may transfer the location service response to a 5GC entity such as a GMLC. If the procedure of FIG. 8 has been initiated by step 1b, the AMF may use the location service response in order to provide a location service related to an emergency call.

Protocol for Location Measurement (1) LTE Positioning Protocol (LPP)

Figure 12:
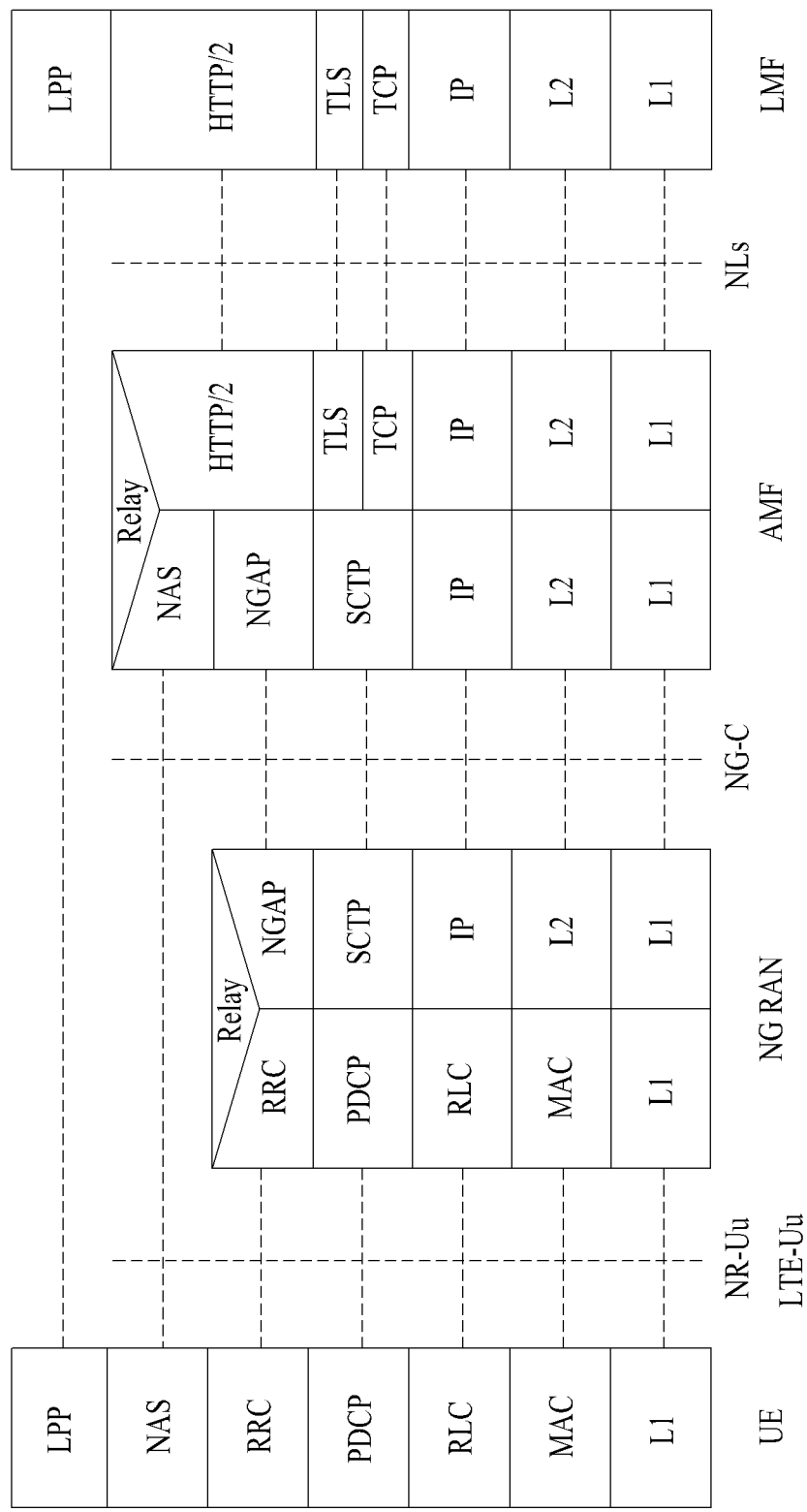
FIG. 12 illustrates an exemplary protocol layer used to support LTE positioning protocol (LPP) message transfer.
Figure 13:
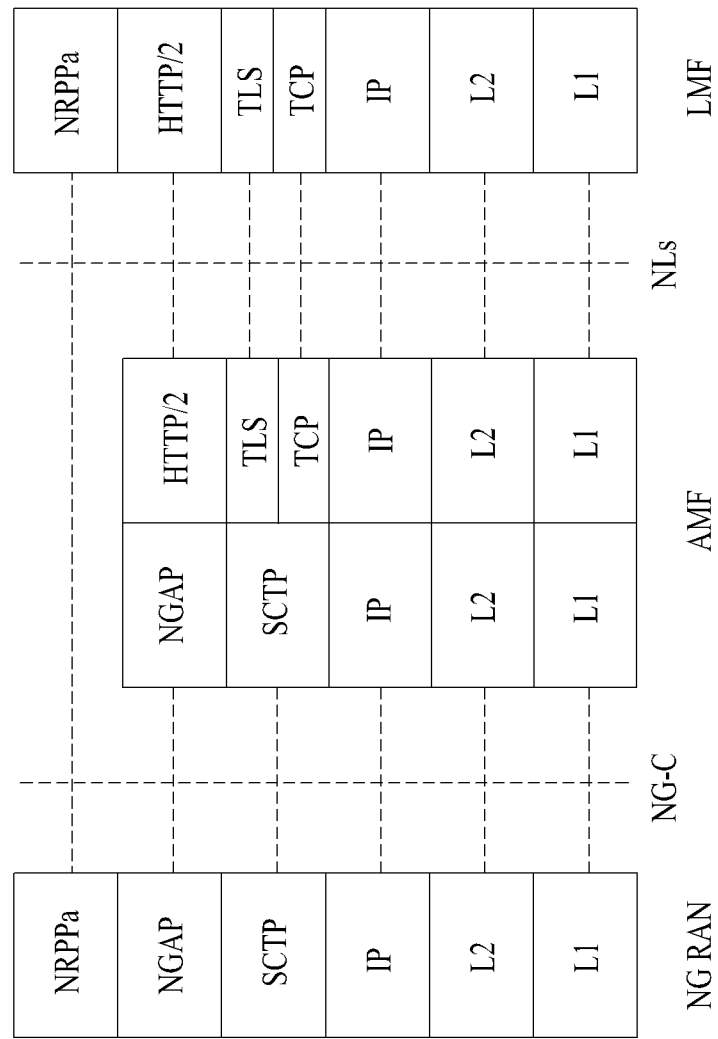
FIG. 13 is a view illustrating an exemplary protocol layer used to support NR positioning protocol A (NRPPa) protocol data unit (PDU) transfer.

FIG. 12 illustrates an exemplary protocol layer used to support LPP message transfer between an LMF and a UE. An LPP protocol data unit (PDU) may be carried in a NAS PDU between an MAF and the UE. Referring to FIG. 9, LPP is terminated between a target device (e.g., a UE in a control plane or an SUPL enabled terminal (SET) in a user plane) and a location server (e.g., an LMF in the control plane or an SLP in the user plane). LPP messages may be carried as transparent PDUs cross intermediate network interfaces using appropriate protocols, such an NGAP over an NG-C interface and NAS/RRC over LTE-Uu and NR-Uu interfaces. LPP is intended to enable positioning for NR and LTE using various positioning methods.

For example, a target device and a location server may exchange, through LPP, capability information therebetween, assistance data for positioning, and/or location information. The target device and the location server may exchange error information and/or indicate stopping of an LPP procedure, through an LPP message.

(2) NR Positioning Protocol A (NRPPa)

FIG. 10 illustrates an exemplary protocol layer used to support NRPPa PDU transfer between an LMF and an NG-RAN node. NRPPa may be used to carry information between an NG-RAN node and an LMF. Specifically, NRPPa may exchange an E-CID for measurement transferred from an ng-eNB to an LMF, data for support of an OTDOA positioning method, and a cell-ID and a cell position ID for an NR cell ID positioning method. An AMF may route NRPPa PDUs based on a routing ID of an involved LMF over an NG-C interface without information about related NRPPa transaction.

An NRPPa procedure for location and data collection may be divided into two types. The first type is a UE associated procedure for transmitting information about a particular UE (e.g., location measurement information) and the second type is a non-UE-associated procedure for transmitting information applicable to an NG-RAN node and associated TPs (e.g., timing information of the gNB/ng-eNG/TP). The two types may be supported independently or simultaneously.

Positioning Measurement Method

Positioning methods supported in the NG-RAN may include a GNSS, an OTDOA, an E-CID, barometric sensor positioning, WLAN positioning, Bluetooth positioning, a TBS, uplink time difference of arrival (UTDOA) etc. Although any one of the positioning methods may be used for UE positioning, two or more positioning methods may be used for UE positioning.

(1) Observed Time Difference of Arrival (OTDOA)

Figure 14:
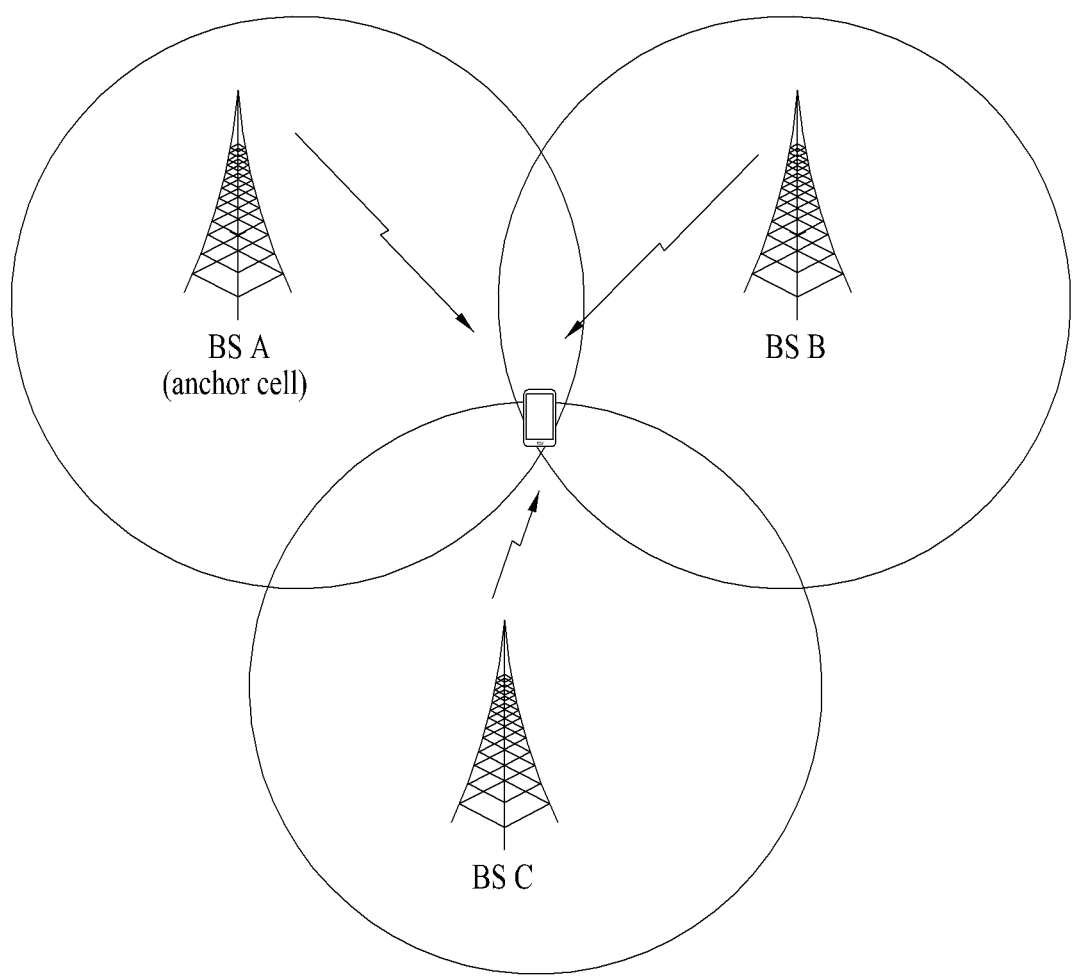
FIG. 14 is a view illustrating an embodiment of an observed time difference of arrival (OTDOA) positioning method.

FIG. 14 is a diagram illustrating an OTDOA positioning method. The OTDOA positioning method uses time measured for DL signals received from multiple TPs including an eNB, an ng-eNB, and a PRS-only TP by the UE. The UE measures time of received DL signals using location assistance data received from a location server. The position of the UE may be determined based on such a measurement result and geographical coordinates of neighboring TPs.

The UE connected to the gNB may request measurement gaps to perform OTDOA measurement from a TP. If the UE is not aware of an SFN of at least one TP in OTDOA assistance data, the UE may use autonomous gaps to obtain an SFN of an OTDOA reference cell prior to requesting measurement gaps for performing reference signal time difference (RSTD) measurement.

Here, the RSTD may be defined as the smallest relative time difference between two subframe boundaries received from a reference cell and a measurement cell. That is, the RSTD may be calculated as the relative time difference between the start time of a subframe received from the measurement cell and the start time of a subframe from the reference cell that is closest to the subframe received from the measurement cell. The reference cell may be selected by the UE.

For accurate OTDOA measurement, it is necessary to measure times of arrival (ToAs) of signals received from geographically distributed three or more TPs or BSs. For example, ToAs for TP 1, TP 2, and TP 3 may be measured, and an RSTD for TP 1 and TP 2, an RSTD for TP 2 and TP 3, and an RSTD for TP 3 and TP 1 are calculated based on the three ToAs. A geometric hyperbola may be determined based on the calculated RSTD values and a point at which curves of the hyperbola cross may be estimated as the position of the UE. In this case, accuracy and/or uncertainty for each ToA measurement may occur and the estimated position of the UE may be known as a specific range according to measurement uncertainty.

For example, an RSTD for two TPs may be calculated based on Equation 3 below.

$$RSTDi, 1 = \frac{\sqrt{(x_t - x_i)^2 + (y_t - y_i)^2}}{c} - \frac{\sqrt{(x_t - x_1)^2 + (y_t - y_1)^2}}{c} + (Ti - T1) + (ni - n1),$$ [Equation 3]

where c is the speed of light, $\{x_t, y_t\}$ are (unknown) coordinates of a target UE, $\{x_i, y_i\}$ are (known) coordinates of a TP, and {$x_1$, $y_1$} are coordinates of a reference TP (or another TP). Here, ($T_i$–$T_1$) is a transmission time offset between two TPs, referred to as "real time differences" (RTDs), and $n_i$ and $n_1$ are UE ToA measurement error values.

(2) Enhanced Cell ID (E-CID)

In a cell ID (CID) positioning method, the position of the UE may be measured based on geographical information of a serving ng-eNB, a serving gNB, and/or a serving cell of the UE. For example, the geographical information of the serving ng-eNB, the serving gNB, and/or the serving cell may be acquired by paging, registration, etc.

The E-CID positioning method may use additional UE measurement and/or NG-RAN radio resources in order to improve UE location estimation in addition to the CID positioning method. Although the E-CID positioning method partially may utilize the same measurement methods as a measurement control system on an RRC protocol, additional measurement only for UE location measurement is not generally performed. In other words, an additional measurement configuration or measurement control message may not be provided for UE location measurement. The UE does not expect that an additional measurement operation only for location measurement will be requested and the UE may report a measurement value obtained by generally measurable methods.

For example, the serving gNB may implement the E-CID positioning method using an E-UTRA measurement value provided by the UE.

Measurement elements usable for E-CID positioning may be, for example, as follows.

UE measurement: E-UTRA reference signal received power (RSRP), E-UTRA reference signal received quality (RSRQ), UE E-UTRA reception (RX)-transmission (TX) time difference, GERAN/WLAN reference signal strength indication (RSSI), UTRAN common pilot channel (CPICH) received signal code power (RSCP), and/or UTRAN CPICH Ec/Io E-UTRAN measurement: ng-eNB RX-TX time difference, timing advance ($T_{ADV}$), and/or AoA Here, $T_{ADV}$ may be divided into Type 1 and Type 2 as follows.

$T_{ADV}$ Type 1=(ng-eNB RX-TX time difference)+(UE E-UTRA RX-TX time difference)

$T_{ADV}$ Type 2=ng-eNB RX-TX time difference

AoA may be used to measure the direction of the UE. AoA is defined as the estimated angle of the UE counterclockwise from the eNB/TP. In this case, a geographical reference direction may be north. The eNB/TP may use a UL signal such as an SRS and/or a DMRS for AoA measurement. The accuracy of measurement of AoA increases as the arrangement of an antenna array increases. When antenna arrays are arranged at the same interval, signals received at adjacent antenna elements may have constant phase rotate.

(3) Uplink Time Difference of Arrival (UTDOA)

UTDOA is to determine the position of the UE by estimating the arrival time of an SRS. When an estimated SRS arrival time is calculated, a serving cell is used as a reference cell and the position of the UE may be estimated by the arrival time difference with another cell (or an eNB/TP). To implement UTDOA, an E-SMLC may indicate the serving cell of a target UE in order to indicate SRS transmission to the target UE. The E-SMLC may provide configurations such as periodic/non-periodic SRS, bandwidth, and frequency/group/sequence hopping.

Discontinuous Reception (DRX)

In the present disclosure, the UE may perform the DRX operation while carrying out the procedures and/or methods described/proposed above. A UE for which DRX is configured may discontinuously receive a DL signal. Thereby, power consumption may be reduced. The DRX may be performed in a radio resource control (RRC)_IDLE mode, an RRC_INACTIVE mode, or the RRC_CONNECTED mode. In the RRC IDLE mode and the RRC_INACTIVE mode, the DRX is used to receive paging signals discontinuously. Hereinafter, DRX performed in the RRC_CONNECTED mode (RRC_CONNECTED DRX) will be described.

Figure 15:
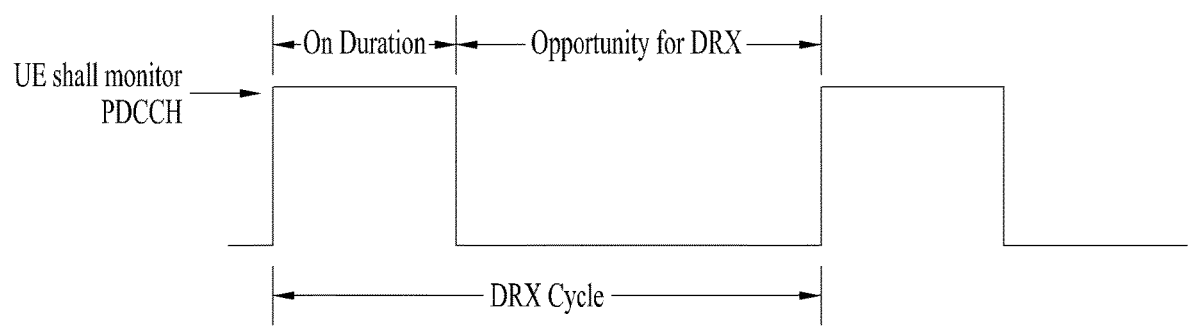
FIG. 15 is a diagram for describing an embodiment of a DRX (Discontinuous Reception) operation.

FIG. 15 is a diagram illustrating a DRX cycle (RRC_CONNECTED state).

Referring to FIG. 15, the DRX cycle includes On Duration and Opportunity for DRX. The DRX cycle defines a time interval in which On Duration is periodically repeated. On Duration is a time period during which the UE monitors to receive a PDCCH. When DRX is configured, the UE performs PDCCH monitoring during the On Duration. When there is any successfully detected PDCCH during the PDCCH monitoring, the UE operates an inactivity timer and is maintained in an awake state. On the other hand, when there is no successfully detected PDCCH during the PDCCH monitoring, the UE enters a sleep state, when the On Duration ends. Therefore, if DRX is configured, PDCCH monitoring/reception may be performed discontinuously in the time domain, when the afore-described/proposed procedures and/or methods are performed. For example, if DRX is configured, PDCCH reception opportunities (e.g., slots having PDCCH search spaces) may be configured discontinuously according to a DRX configuration in the present disclosure. On the contrary, if DRX is not configured, PDCCH monitoring/reception may be performed continuously in the time domain. For example, if DRX is not configured, PDCCH reception opportunities (e.g., slots having PDCCH search spaces) may be configured continuously in the present disclosure. PDCCH monitoring may be limited in a time period configured as a measurement gap, irrespective of whether DRX is configured.

Table 5 describes a UE operation related to DRX (in the RRC_CONNECTED state). Referring to Table U1, DRX configuration information is received by higher-layer (RRC) signaling, and DRX ON/OFF is controlled by a DRX command of the MAC layer. Once DRX is configured, the UE may perform PDCCH monitoring discontinuously in performing the described/proposed procedures and/or methods according to the present disclosure, as illustrated in FIG. 15.

TABLE 5

| | Type of signals | UE procedure |
|---|---|---|
| 1$^{st}$ step | RRC signalling (MAC-CellGroupConfig) | Receive DRX configuration information |
| 2$^{nd}$ Step | MAC CE ((Long) DRX command MAC CE) | Receive DRX command |
| 3$^{rd}$ Step | — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following information in defining DRX.

Value of drx-OnDurationTimer: defines the length of the starting duration of a DRX cycle.

Value of drx-Inactivity Timer: defines the length of a time duration in which the UE is in the awake state after a PDCCH occasion in which a PDCCH indicating initial UL or DL data has been detected.

Value of drx-HARQ-RTT-TimerDL: defines the length of a maximum time duration from reception of a DL initial transmission to reception of a DL retransmission.

Value of drx-HARQ-RTT-TimerDL: defines the length of a maximum time duration from reception of a grant for a DL initial transmission to reception of a grant for a UL retransmission.

drx-LongCycleStartOffset: defines the time duration and starting time of a DRX cycle.

drx-ShortCycle (optional): defines the time duration of a short DRX cycle.

When at least one of drx-OnDurationTimer, drx-InactivityTimer, drx-HARQ-RTT-TimerDL, or drx-HARQ-RTT-TimerDL is running, the UE performs PDCCH monitoring in each PDCCH occasion, while staying in the awake state.

The location server referred to in the present disclosure may be a specific BS that manages a wireless positioning operation. Alternatively, it may be a server/subject that manages a positioning operation as an entity independent of the BS. Since the New RAT (NR) system is highly likely to operate as a narrow-beam-based system, the BS/LMF/location server may instruct/configure the UE to report the measurement of the UE in consideration of the TX/RX beam sweeping operation of the transceiver.

FIGS. 16 to 19 are diagrams for explaining an example of implementing operations of a UE, a BS, and a location server according to an embodiment of the present disclosure.

Figure 16:
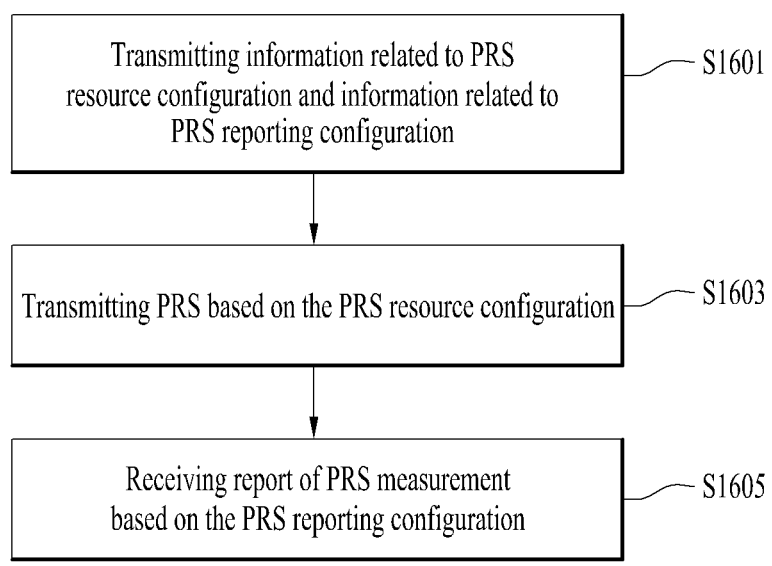
FIGS. 16 to 19 are diagrams for explaining an example of implementing operations of a terminal, a base station, and a location server according to an embodiment of the present disclosure.

FIG. 16 is a diagram for explaining an example of implementing the operation of the BS according to an embodiment of the present disclosure. Referring to FIG. 16, the BS may transmit information related to PRS resource configuration and information related to PRS reporting configuration (S1601). A detailed example of a method for configuring a PRS resource and PRS reporting and information therefor may be based on Embodiments 1 to 7.

The BS may transmit a PRS based on the PRS resource configuration (S1603) and receive a report related to PRS measurement based on the PRS reporting configuration (S1605). A specific method for the BS to transmit the PRS and receive a report related to the PRS measurement may be based on Embodiments 1 to 7.

The BS of FIG. 16 may be any one of the various devices of FIGS. 23 to 26. For example, the BS of FIG. 16 may be a second wireless device 200 of FIG. 23 or a wireless device 100, 200 of FIG. 24. In other words, the operation of the BS disclosed in FIG. 16 may be implemented or performed by any one of the various devices of FIGS. 23 to 26.

Figure 17:
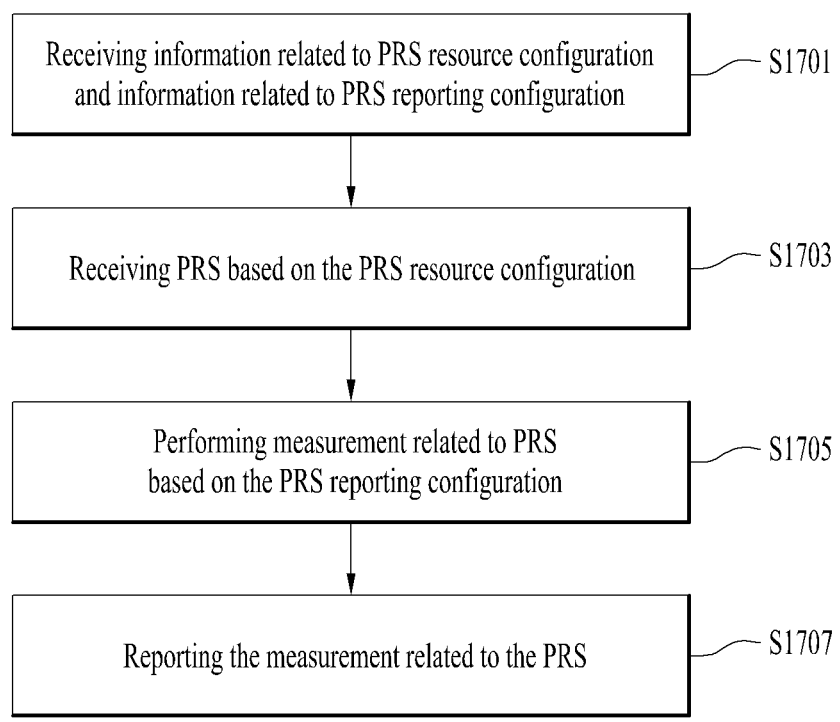

FIG. 17 is a diagram for explaining an example of implementing the operation of the UE according to an embodiment of the present disclosure. Referring to FIG. 17, the UE may receive information related to PRS resource configuration and information related to PRS reporting configuration (S1701). Specific examples of a method for configuring a PRS resource and PRS reporting and information therefor may be based on Embodiments 1 to 7.

The UE may receive a PRS based on the PRS resource configuration (S1703), perform PRS-related measurement based on the received PRS and the PRS reporting configuration (S1705), and report the PRS-related measurement (S1707). A specific method for the UE to receive the PRS, to perform the related measurement and report the same may be based on Embodiments 1 to 7.

The UE of FIG. 17 may be any one of the various devices of FIGS. 23 to 26. For example, the UE of FIG. 17 may be a first wireless device 100 of FIG. 23 or the wireless device 100, 200 of FIG. 24. In other words, the operation of the UE disclosed in FIG. 17 may be implemented or performed by any one of the various devices of FIGS. 23 to 26.

Figure 18:
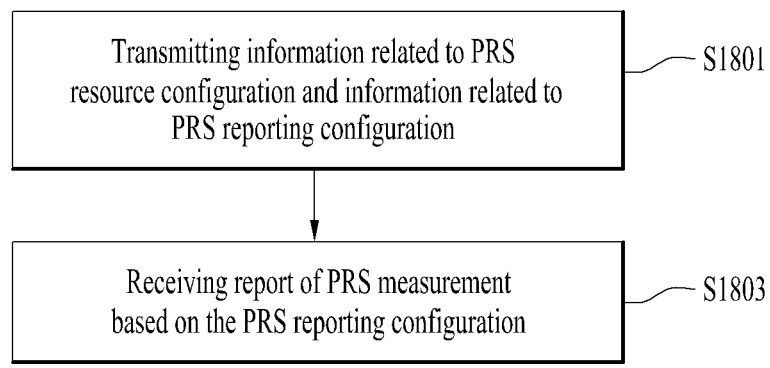

FIG. 18 is a diagram for explaining an example of implementing the operation of the location server according to an embodiment of the present disclosure. The location server may transmit information related to PRS resource configuration and information related to PRS reporting configuration (S1801). A detailed example of a method for configuring a PRS resource and PRS reporting and information therefor may be based on Embodiments 1 to 7.

The location server may receive a report related to PRS measurement based on the PRS reporting configuration (S1803). A specific method for the location server to receive a report related to PRS measurement may be based on Embodiments 1 to 7.

Figure 27:
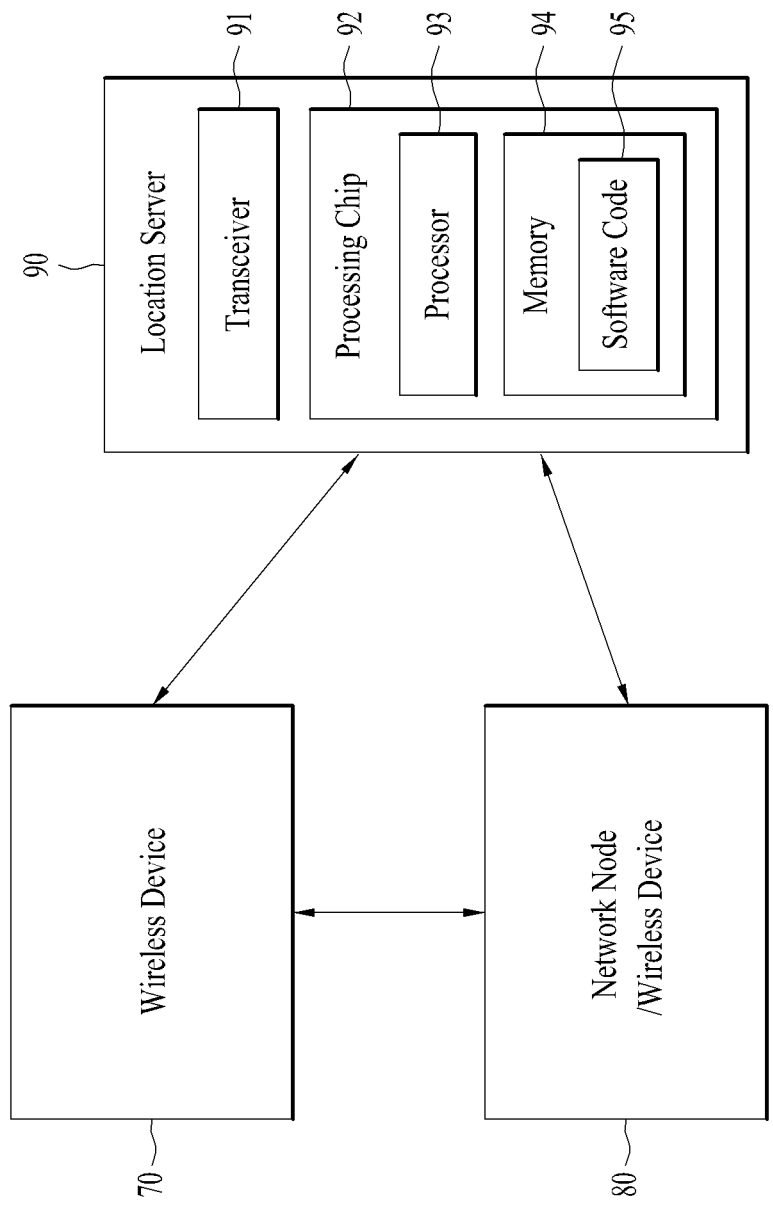
FIG. 27 shows an exemplary location server to which embodiments of the present disclosure are applied.

The location server of FIG. 18 may be the location server 90 disclosed in FIG. 27. In other words, the operation disclosed in FIG. 18 may be performed or operated by the location server 90 of FIG. 27.

Figure 19:
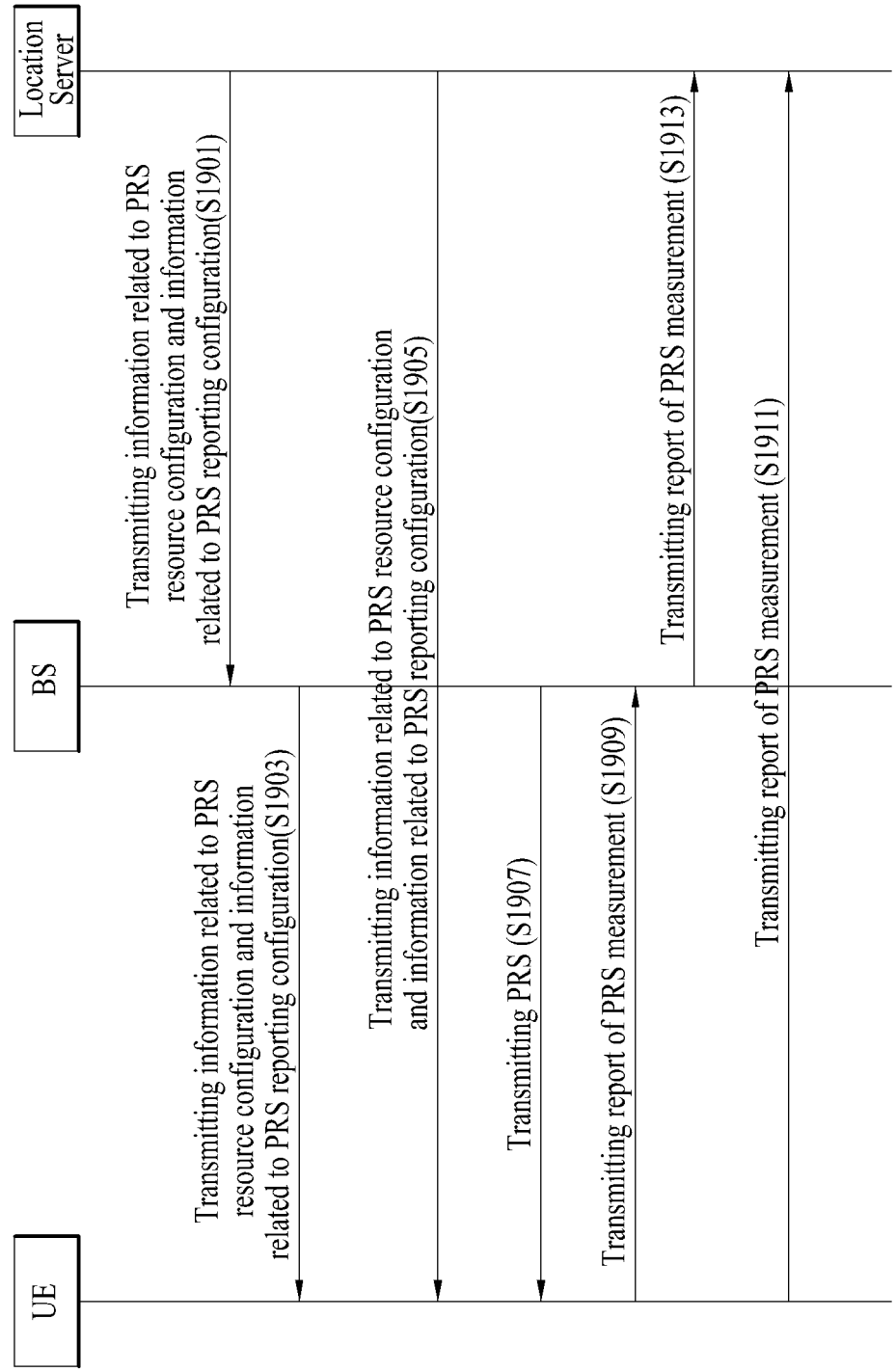

FIG. 19 is a diagram for explaining an example of implementing the operation of a network according to an embodiment of the present disclosure. Referring to FIG. 19, the location server may transmit information related to PRS resource configuration and information related to PRS reporting configuration to the BS (S1801), and the BS deliver the information related to the PRS resource configuration and the PRS reporting configuration to the UE (S1803). The location server may directly transmit the information related to the PRS resource configuration and the information related to the PRS reporting configuration to the UE (S1805). In other words, when operation S1805 is performed, operations S1801 to S1803 may be skipped. That is, operation S1805 and operations S1801 to S1803 may be selectively performed.

Detailed information and/or contents constituting the information related to the PRS resource configuration and the information related to the PRS report configuration transmitted in S1801 to S1805 may be based on Embodiments 1 to 7.

The BS may transmit the PRS to the UE based on the information related to the PRS resource configuration (S1807), and the UE may measure the received PRS and transmit a report on the PRS measurement to the BS and/or the location server (S1809 to S1811). Once the UE transmits the report on the PRS measurement to the BS, the BS may deliver the report on the PRS measurement to the location server (S1813). In other words, when the UE directly transmits the report on the PRS measurement to the location server as in operation S1811, operations S1809 and S1813 may be skipped. That is, operation S1811 and operations S1809/S1813 may be selectively performed. A specific method for performing the PRS measurement reporting disclosed in FIG. 19 may be based on Embodiments 1 to 7, which will be described later.

Reporting Behavior for RAT-Dependent Positioning

A PRS block may be defined as a basic unit of PRS transmission and reception for measurement and/or reporting considering the TX beam sweeping of multiple TPs/BSs for a single RX beam. A PRS occasion may be defined as a repeated structure of the PRS block. The PRS block mentioned in the present disclosure may correspond to a specific TX beam of each TP/BS. As described above, the PRS block may be configured/indicated/defined by reflecting multi-beam sweeping of the TP/BS. The LMF/location server may configure/indicate the PRS block for/to the UE. The PRS block may be a basic unit of PRS transmission and reception and a basic unit of a measurement acquisition and/or measurement reporting operation for the PRS by the UE.

To design the PRB block including a plurality of PRS resource sets, the following elements may be considered.

Figure 20:
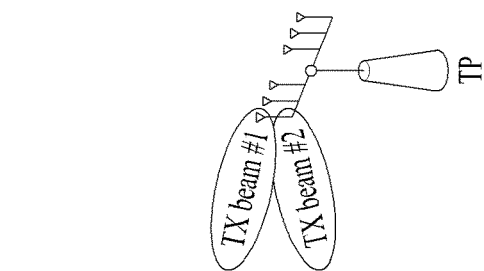
FIG. 20 shows an example of allocating PRS resources according to the present disclosure.
Figure 20:
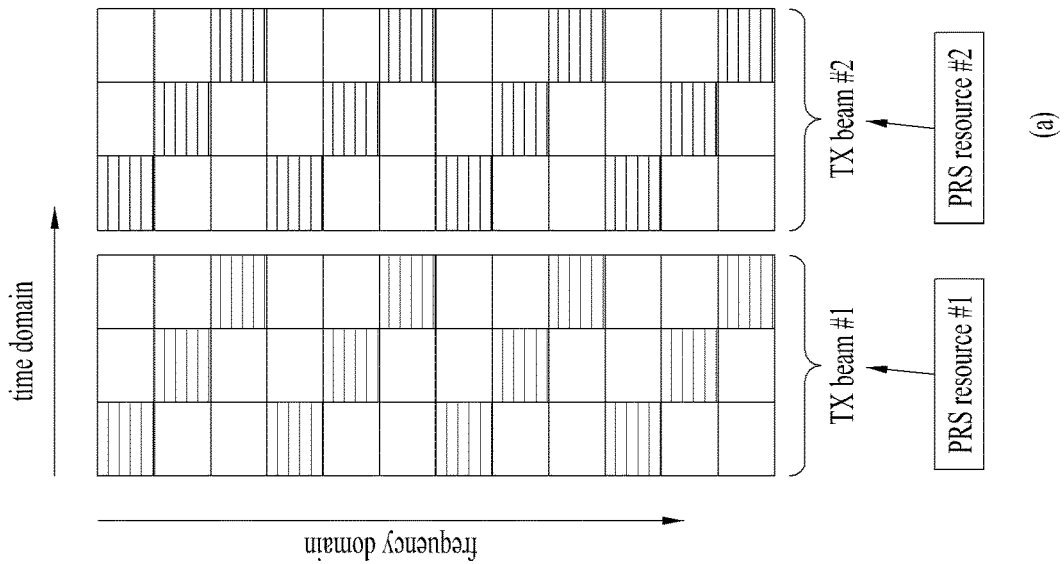
Figure 20:
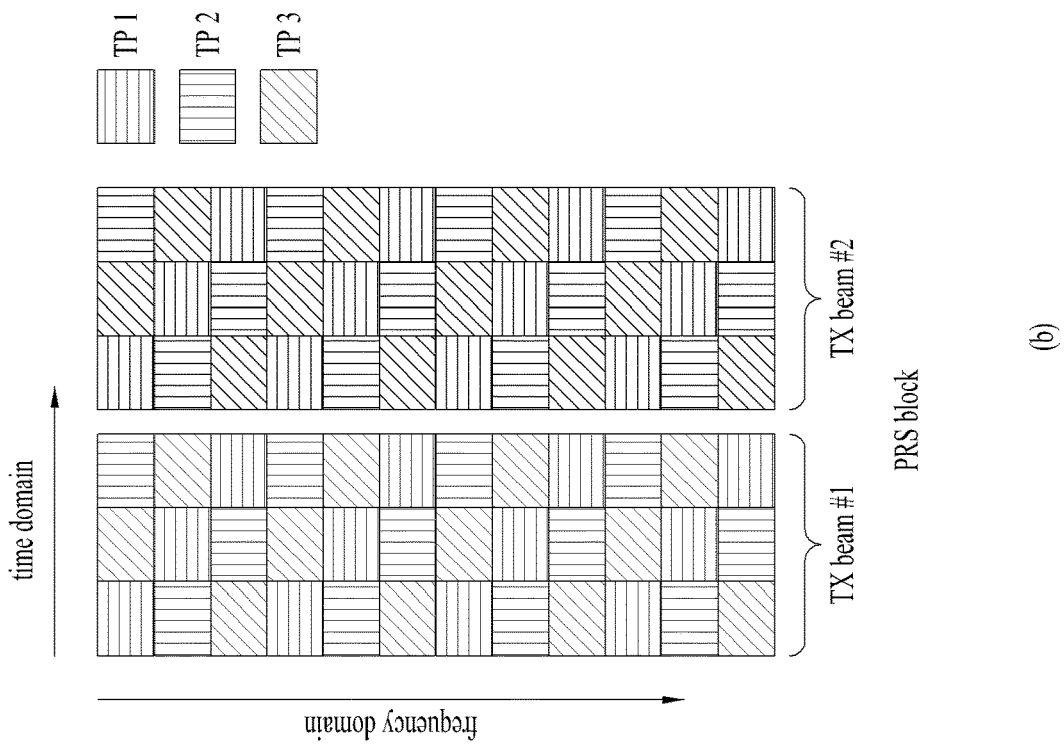

Referring to FIG. 20($a$), in terms of a single TP/BS, all PRS resources within a PRS resource set may be transmitted within one PRS block. Since one PRS resource corresponds to one TX beam, the PRS may be transmitted through multiple TX beams within one PRS block.

Referring to FIG. 20($b$), in consideration of all TPs/BSs, frequency RSs and time REs within a RPS block may be fully occupied by the PRS resource set.

For example, when three TPs/BSs with a TX beam sweeping periodicity of 2 are considered, three PRS resource sets are present and each of the three PRS resource sets may include two PRS resources corresponding respectively to two TX beams of each TP/BS.

Figure 21:
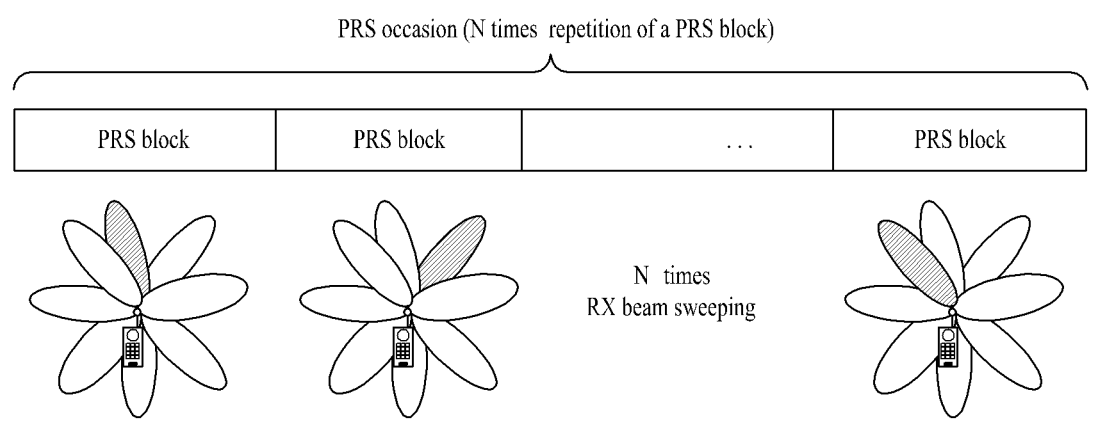
FIG. 21 shows an example of configuring a PRS occasion according to the present disclosure.

Referring to FIG. 21, a PRS occasion has a structure in which a PRS block is repeated N times. The network/LMF may repeatedly transmit the PRS block and the UE may receive the PRS block or perform RX beam sweeping according to capability in order to improve hearability.

(1) Embodiment 1: Reporting Configuration Related to Time Resource and Beam Sweeping Operation A BS/LMF/location server may be linked/connected/related to a PRS transmitted in a specific time resource, time interval, and/or time unit to instruct/configure the UE to perform or report at least one of ToA/RSTD/TDOA/AoA or ToA/RSTD/TDOA/AoA+RSSI/RSRP measurement. The RSSI/RSRP measurement may be calculated based on an average of measured received signal strength values. The BS/LMF/location server may instruct the UE to report the index of a PRS resource corresponding to a measurement value reported by the UE.

For example, the BS/LMF/location server may configure/instruct/command the UE to report measurement information, such as AoA, ToA, and/or RSTD, which is obtained by the UE by receiving the PRS, in units of a PRS block/PRS occasion/PRS occasion group. The BS/LMF/location server may configure/instruct the UE to acquire and report the measurement information, such as AoA, ToA, and/or RSTD, in units of a specific PRS block/PRS occasion/PRS occasion group.

This operation may be important in association with a time unit in which a TX/RX beam sweeping operation of the TP/BS and/or the UE is performed.

For example, the BS/LMF/location server may configure/indicate, for/to the UE, a TX/RX beam sweeping operation for transmitting and receiving the PRS as follows.

1) One PRS block may be designed based on PRS transmission while one or more TPs/BSs sweep a TX beam. For example, the PRS block may be configured in consideration of a TX beam sweeping period and/or the total number of TX beam sweeping operations needed by each TP/BS within one PRS block.

2) One PRS block may be designed/configured such that one or more TPs/BSs repeatedly transmit the PRS through the same TX beam. The PRS block may cause the UE to acquire signal-to-noise ratio (SNR) gain while the UE repeatedly receives the PRS. Alternatively, when the UE repeatedly receives the same PRS, the UE may perform measurement based on an RX beam while sweeping the RX beam.

3) One PRS block may be configured/defined by simply grouping a plurality of OFDM symbols without considering RX beam sweeping of the UE and/or TX beam sweeping of the TP/BS.

4) A PRS occasion may be configured as a larger unit than the PRS block, and multiple PRS blocks may constitute one PRS occasion. For example, one PRS occasion may be configured such that the PRS may be transmitted to the UE N($\geq$1) times through each TX beam in consideration of a beam sweeping period during which each TP/BS sweeps the TX beam M($\geq$=1) times. For example, the PRS may be transmitted and received within one PRS occasion in consideration of both a TX beam sweeping period of the BS and an RX beam sweeping period of the UE. Here, M indicating the number of beam sweeping operations of each TP/BS may differ according to each TP/BS. One or more PRS occasions may be defined/configured/indicated as one PRS occasion group.

5) The RX beam sweeping operation of the UE receiving the PRS may be performed in the following unit.

A TX beam may be fixed and an RX beam may be swept in units of one or more PRS resources.

The RX beam may be swept in units of a PRS block. In this case, the TX beam may be swept within a PRS block.

The RX beam may be swept in units of a PRS occasion. In this case, the TX beam may be swept within a PRS occasion.

When the same PRS is transmitted multiple times using the same DL TX beam, the UE may acquire sufficient repetition and SNR gain by receiving the PRS transmitted multiple times through the same DL TX beam using one fixed RX beam and sweep a PRS RX beam.

The RX beam may be swept in units of a PRS occasion group.

The RX beam may not be swept. In other words, the UE may repeatedly acquire a measurement value using an indicated RX beam and may report the measurement value.

For example, when one PRS block is configured in consideration of a TX beam sweeping period including M(>1) TX beams as illustrated in FIG. 21, the UE may be instructed/configured to receive, through the same RX beam, a PRS transmitted through M(>1) TX beams and then to report L(>0) best AoA/ToA/RSTD/TDOA/RSRP measurement values. Here, the L best measurement values may mean the smallest ToA/RSTD/TDOA value and/or the largest RSRP/RSSI value.

To acquire or report measurement information, the BS/LMF/location server may instruct or configure the UE to use a specific RX beam. The BS/LMF/location server may also instruct/configure the UE to report ToA/RSTD/TDOA in association with one PRS occasion.

Here, within one PRS occasion, the TP/BS may transmit the PRS through all available TX beams and the UE may receive, through all available RX beams, the PRS transmitted through each TX beam. Alternatively, within one PRS occasion, the PRS may be transmitted through all available TX beams and may be received through all available RX beams.

Instructing measurement reporting in association with the PRS occasion group may mean that a TX/RX beam sweeping period for transmitting and receiving the PRS is repeated multiple times. In other words, instructing measurement reporting in association with the PRS occasion group indicates that transmission of the PRS using a specific TX beam and reception of the PRS using a specific RX beam are repeated multiple times, so that a more accurate measurement value may be reported through repetition gain.

When a CSI-RS resource set is configured in association with a TX/RX beam sweeping operation, "repetition" defined by a higher layer parameter may be set to "ON" or "OFF" so that the UE may recognize/assume whether a CSI-RS resource included in a specific CSI-RS resource set is transmitted through the same TX beam.

Similarly, a PRS resource may be configured. For example, a configuration parameter of a unit of grouping a PRS resource set/group or multiple PRS resource sets/groups may be introduced so that whether TX beam sweeping is performed according to a time/space/frequency resource of a specific TP/BS may be configured/indicated by "ON"/"OFF". For example, the configuration parameter may be set to "OFF" so that the UE may recognize that PRS resources included in a specific PRS resource set/group are transmitted through the same TX beam. Here, the meaning of "the PRS resources are transmitted through the same TX beam" is that PRS transmission is performed without performing TX beam sweeping over time. That is, this means that the PRS is transmitted through one TX beam.

When configuring the beam sweeping operation of the PRS, the following configuration different from the configuration of a CSI-RS may be additionally considered.

1) Whether to perform TX beam sweeping according to a time/frequency resource of a TX beam through which a specific TP/BS transmits the PRS may be configured or indicated in units of a PRS block, a PRS occasion, and/or a PRS occasion group in which the PRS is transmitted.

2) Unlike the CSI-RS, for the PRS, the BS/LMF/location server may indicate, to the UE, whether TX beam sweeping is performed and also instruct or configure the UE to perform a measurement reporting operation in connection/linkage/association with a specific time resource (e.g., a PRS block/PRS occasion/PRS occasion group). The BS/LMF/location server may also configure/instruct the UE to perform measurement acquisition and/or measurement reporting for a specific TX beam of a specific TP/BS and a specific RX beam of the UE. Additionally, this operation of the UE may be instructed/configured to be performed only in a specific PRS block, a PRS occasion, and/or a PRS occasion group.

3) When a CSI-RS, an SRS, an SS/PBCH block etc., other than a dedicated PRS, are used for positioning, the BS/LMF/location server may indicate, to the UE, whether TX beam sweeping is performed and also instruct/configure the UE to perform a measurement reporting operation in connection/linkage/association with a specific time resource (e.g., a PRS block, consecutive slots, a specific time interval, or a specific period).

For the above measurement of the UE, all measurement information such as RSTD, AoA, AoD, ToA, TDOA, RSRP, RSSI, etc. capable of being used for UE positioning may be included. This may be related to a time resource unit in which the beam sweeping operations of the TP/BS and the UE are performed. Importance of reporting configuration/indication associated with TX/RX beam sweeping may increase according to the structure of a dedicated RS defined/configured for positioning.

In addition, the PRS may be configured differently from an SS/PBCH block that defines a specific RS resource/unit transmitted through one TX beam as one block. For example, if the PRS is defined/configured in units of an RS resource and/or RS resource set similarly to the CSI-RS, the BS/LMF/location server may configure/indicate to the UE whether TX beam sweeping is performed, together with a PRS configuration, so that the UE may recognize whether a TX beam of a specific TP/BS for each PRS resource and/or PRS resource set is swept when the TP/BS transmits the PRS. In addition, a reporting unit for acquired measurement may be indicated/configured to/for the UE.

(2) Embodiment 2: Reporting Operation Related to PRS Frequency Resource

The BS/LMF/location server may configure/instruct the UE to perform a specific reporting operation in association/linkage with a PRS transmitted on a specific frequency resource.

For example, the BS/LMF/location server may configure/indicate different measurement reporting according to a PRS frequency band in which the PRS is transmitted to the UE. In addition, the BS/LMF/location server may indicate/configure a specific beam to be used by the UE according to each PRS frequency band.

To measure the position of the UE using both a time-based positioning scheme, such as OTDOA, and an angle-based positioning scheme, the UE may be instructed to perform ToA/RSTD/TDOA reporting for a specific PRS frequency resource and to perform measurement reporting related to angle, such as AoA, for another specific PRS frequency resource.

Although the BS transmits the PRS in $K(\gg 1)$ RBs, the BS may instruct the UE to report ToA/RSTD/TDOA/AoA only for $k(\ll K)$ RBs among RBs in which the PRS is transmitted to the UE according to UE capability.

Instructing/configuring the UE to report the measurement in connection/association with such frequency resources may be performed together with instructing/configuring the UE to report the measurement in connection/association with the specific time resource presented in Embodiment 1 above. In addition, the above-described measurement may refer to all measurement information that may be used for UE positioning, including ToA/RSTD/TDOA/AOA and RSSI/RSRP.

(3) Embodiment 3: Reporting Operation Related to PRS Spatial Resource

For UE positioning, the UE may receive RSs such as PRSs transmitted by a plurality of cells/BSs/TRPs and perform measurement and reporting of ToA/RSTD/AoA.

Considering that different PRS resource sets are transmitted by different TRPs/BSs/cells, as a default operation for RSTD reporting, the UE may select a PRS resource with a minimum ToA from each PRS resource set and report RSTD between PRS resources with minimum ToAs in different PRS resource sets to the LMF/location server. This operation of the UE may be indicated/configured by the BS/LMF/location server.

The BS/LMF/location server may indicate/configure, to/for the UE, a specific RX panel of the UE for PRS measurement and/or reporting. For example, the BS/LMF/location server may configure/instruct the UE to perform measurement, such as ToA or RSTD, with respect to a specific RX panel and to perform measurement related to angle, such as AoA, with respect to another panel.

The BS/LMF/location server may configure/instruct the UE to use a specific panel (e.g., an RX panel for DL or a TX panel for UL) in a specific PRS block, a specific PRS occasion, and/or a specific PRS occasion group.

The BS/LMF/location server may configure/instruct the UE to use a specific panel (e.g., an RX panel for DL or a TX panel for UL) for measurement for a specific PRS resource and/or a PRS resource set.

The UE may report AoA values measured for respective RX panels to the BS/LMF/location server. However, when the difference between AoA values measured for respective RX panels is less than a specific threshold value, the UE may report only an AoA value measured for a specific panel or an average value of AoA values measured for the RX panels. This operation of the UE may be indicated/configured by the BS/LMF/location server. The UE also reports information about a measured panel of the UE and an AoA value for the measurement panel together.

(4) Embodiment 4: Positioning Method Similar to E-CID

Like the E-CID scheme of the LTE system, cell information that the UE receives may be used for UE positioning even in the NR system. In the NR system, different PRS sets such as a CSI-RS may be allocated to different TPs/BSs or the same TP/BS in consideration of a plurality of TPs/BSs using multiple beams. UE positioning may be performed as follows using a PRS set ID.

1) When PRS Resource Sets are Allocated to Different BSs/TPs/Cells:

When different PRS resource sets are allocated to different TPs/BSs/cells, the UE may report PRS resource set indexes to the LMF/location server so that the LMR/location service may recognize the position of the UE. The UE may be configured/instructed to report a maximum RSRP/RSSI/ signal-to-interference-plus-noise ratio (SINR) and/or AoA value together with the PRS resource sets.

For example, as the result of performing measurement for each PRS resource set, the UE may be configured/instructed to report a PRS resource set ID in which a PRS resource having maximum RSRP/RSSI is included to the BS/LMF/ location server. For example, it is assumed that TRP #0 transmits PRS resources #00 to #03 through 4 different TX beams, PRS resources #00 to #03 are included in PRS resource set #0, TRP #1 transmits PRS resources #10, #20, #30, and #40 through 4 different TX beams, and the PRS resources #10 to #40 are included in a PRS resource set #1. When the RSRP/RSSI of PRS resource #00 is the largest, the UE reports an index of the PRS resource set in which PRS resource #00 is included to the BS/LMF/location server, and the BS/LMF/location server may recognize the position of the UE through the index of the PRS resource set. In other words, since one PRS resource set corresponds to one TP/BS, if the UE reports the PRS resource set ID having the maximum RSRP/RSSI to the BS/LMF/location server, the BS/LMF/location server may estimate a TP/BS nearest the position of the UE and recognize an approximate position of the UE without additional calculation.

According to configuration of the BS/TP/location server and/or an environment in which the UE performs an operation, the UE may report an RSTD/ToA value and a PRS resource set ID corresponding to the RSTD/ToA value, rather than the maximum RSRP/RSSI, to the BS/LMF/ location server. In this case, a minimum RSTD/ToA value may be reported as the RSTD/ToA value and a PRS resource set ID having the minimum RSTD/ToA value may be reported to the BS/LMF/location server.

The UE may also be instructed/configured to report, to the LMF/location server, information about a PRS resource set, such as a PRS resource set index, and information (e.g., a PRS resource index and an RSRP/RSSI value corresponding thereto) related to a PRS resource having a maximum measurement value (e.g., maximum RSRP/RSRQ/RSSI/ SINR) among PRS resources included in the corresponding PRS resource set.

The UE may report the PRS resource set index to the LMF/location server so that the LMF/location server may recognize a TP/BS/cell of coverage in which the UE is positioned. The UE may additionally report a PRS resource index having a maximum measurement value to the BS/LMF/location server so that the BS/LMF/location server may accurately recognize information about the position of the UE within the TP/BS/cell. If the LMF/location server is aware of direction information of a TX beam for each PRS resource of a specific TP/BS/cell, the LMF/location server may recognize the position, direction, and/or distance of the UE from the specific TP/BS.

The UE may be instructed/configured to report information about a PRS resource (e.g., a PRS resource index) having a maximum measurement value (e.g., maximum RSRP/RSRQ/RSSI/SINR) among configured PRS resources to the LMF/location server, without information about a PRS resource set.

Even when the UE is configured with one PRS resource set or multiple PRS resource sets, if PRS resources are not shared between different PRS resource sets, the position of the UE may be recognized even if information about a specific PRS resource is reported to the BS/LMF/location server.

2) When PRS Resource Sets are Allocated to One TRP/ BS/Cell:

When different PRS resource sets are allocated to the same TRP/BS/cell, the UE may report an ID for identifying the TRP/BS/cell to which the PRS resource sets are allocated, a PRS resource index, and/or a PRS resource set index to the LMF/location server, so that the LMF/location server may recognize the position of the UE. In this case, the UE may report a PRS resource index and/or a PRS resource set index having a maximum measurement value (e.g., RSRP/ RSSI/SINR).

When different PRS resource sets are allocated to one TRP/BS/cell, different PRS resource sets may be used for different TX/RX panels of the same TRP/BS/cell. For example, one PRS resource set may be used per TX/RX panel and multiple TX/RX beams used in each panel may be transmitted through multiple PRS resources within one PRS resource set. Since each panel may have directivity in a specific direction in different regions, a TRP/BS/cell and/or a region in which the UE is positioned may be identified using an ID of the TRP/BS/cell and a PRS resource set ID.

In the LTE system, when a cell in which the UE is positioned is changed for an E-CID scheme, the UE reports information about the changed cell. Based on this premise, the following reporting method may be considered in the NR system.

For RS (e.g., CSI-RS and/or PRS) resources for which the UE performs measurement, an RS resource set in which an RS resource having a maximum measurement value (e.g., RSRP/RSSI/SINR) is included may be changed. If a cell or cell ID in which the UE is positioned is changed, the UE may report information indicating that the cell or cell ID has been changed, information about the changed cell, and/or information about the changed RS resource set to the LMF/location server.

Since information about a BS/TRP/cell in which the UE is positioned or information about a specific region within a specific BS/TRP/cell may be identified by the information about the RS resource set, triggering reporting based on the premise that the cell or cell ID in which the UE is positioned has been changed may be usefully used. When persistent measurement acquirement is needed, the RS may be limited to an RS which is periodically/semi-persistently transmitted.

For UE positioning, measurement for the RS may be configured with a considerably long period. The RS may be additionally configured for UE positioning. Particularly, for the E-CID based scheme, a specific RS resource and/or RS resource set may be configured.

If an RS resource set in which RS resources having a maximum measurement value (e.g., maximum RSRP/RSSI/SINR) are included is changed with respect to RS (e.g., CSI-RS) resources for which the UE performs measurement, the UE may report information indicating that the RS resource set has been changed and/or information about the changed RS resource set to the LMF/location server. In this case, the meaning of "the RS resource set has been changed" may indicate that a TP/BS/cell in which the UE is positioned has been changed.

(5) Embodiment 5: RAT-Dependent Positioning Technique Using Angle Information For an RS (e.g., a PRS or a CSI-RS) transmitted by the TRP/BS/cell, the UE may report angle information such as AoA to the LMF/location server. In this case, the beam sweeping operation of the BS/TRP needs to be considered.

The UE may perform measurement for received signal strength, such as RSRP/RSSI/SINR, and measurement for AoA, with respect to all RS resources included in a configured RS resource set (e.g., a PRS resource set). The UE may report an AoA value for an RS resource having the largest RSRP/RSSI/SINR value to the BS/LMF/location server and the BS/LMF/location server may configure such an operation for the UE. The UE may also report an RS resource index and/or a corresponding RSRP/RSSI value, together with the AoA information, to the LMF/location server and the BS/LMF/location server may configure/instruct the UE to perform such an operation.

AoA of the UE may greatly vary according to a TX beam direction. An RS may be transmitted through a different TX beam according to each RS resource. To improve the accuracy of UE positioning, the UE may measure AoA for an RS resource transmitted through a beam having the largest RSRP/RSSI/SINR value of a received RS resource and report the measured AoA value to the BS/LMF/location server.

The above-described operation may be performed with a DL beam management protocol. For example, when performing DL beam sweeping by configuring RS resource sets, the UE may perform measurement for AoA together with measurement for RSRP/RSSI/SINR for a plurality of RS resources included in an RS resource set. However, the UE may report information about RSRP/RSSI/SINR to the BS and report information about AoA to the LMF/location server.

Additionally, a positioning scheme using a time difference such as OTDOA and a positioning scheme using AoA may be used together to improve positioning accuracy.

If a single RS resource set is configured in one TRP/BS/cell and different RS resource sets are configured in different TRPs/BSs/cells, the UE may calculate and report a ToA difference between RS resources included in different RS resource sets upon calculating an RSTD by receiving RSs transmitted in different TRPs/BSs.

The UE may perform measurement for both ToA and AoA with respect to all RS resources included in an RS resource set such as a PRS resource set. The UE may report information about an RS resource having a minimum ToA, information about the minimum ToA, and/or a corresponding AoA value to the LMF/location server. When specific RS resources for measurement and reporting for timing information and/or angle information are indicated/configured to/for the UE, the UE may report AoA for the indicated/configured RS resources and an RSTD value between the indicated/configured RS resources together.

If different RS resource sets are transmitted by different TRPs/BSs/cells, the UE may acquire measurement for ToA and/or AoA with respect to RS resources included in each RS resource set and report a time difference (e.g., RSTD) value between RS resources having minimum ToAs in respective RS resource sets and an AoA value for an RS resource indicating a minimum ToA in each RS resource set to the LMF/location server.

(6) Embodiment 6: Reporting Configuration for RS-Based Common Sequence

To reduce complexity for a cross-correlation operation of the UE, when RSs such as PRSs are transmitted by a plurality of TRPs/BSs/cells, RS resources to which the same sequence is allocated may be simultaneously transmitted by a single frequency network (SFN) scheme and ToA for the RS resources may be measured.

Since the same sequence is applied to the PRSs transmitted by a plurality of BSs/TRPs, although ToA information may not be obtained by distinguishing between TRPs/cells, the PRSs to which the same sequence is allocated may be used to adjust a cross-correlation search window for receiving PRSs using independent sequences in different BSs/cells. In the RS based common sequence scheme, the same RS resource may be transmitted by the multiple TPs/BSs or only RS resource IDs differ and the same time/frequency/sequence may be allocated. However, in this case, a time domain operation and/or periodicity may differ.

The operation of the UE for the above-described RS based common sequence scheme may be as follows.

1) ToA reporting: Since the RSs are transmitted not by one TP/BS but by multiple BSs/TPs, reporting of a first peak in cross-correlation may not be greatly meaningful. Therefore, the UE may report an average ToA value to the BS/LMF/location server. The UE may also report a ToA value corresponding to a first peak and a ToA value corresponding to a last peak to the BS/LMF/location server.

2) RSTD reporting: The UE may report a maximum RSTD value based on the measured ToA value to the BS/LMF/location server.

For reporting by the UE as described above, the BS/LMF/location server may indicate to the UE that the RS based common sequence transmission scheme in which specific RS resources, such as PRSs, and/or specific RS resource sets are simultaneously transmitted by a plurality of TRPs/BSs/cells is used. In this case, with respect to the indicated configured RS resources and/or RS resource sets, the UE may recognize that the UE should identify arrival times of RSs transmitted by the plural BSs/TRPs rather than searching for only one first peak exceeding a specific threshold value.

For example, if an average ToA and/or a maximum RSTD is configured/indicated by the BS/LMF/location server as reporting content for specific RS resources such as PRS resources or CSI-RS resources, since the specific RS resources are simultaneously transmitted by multiple TRPs/BSs, the UE may recognize that the specific RS resources serve to adjust a cross-correlation search window by identifying arrival times of the RSs transmitted by the multiple TRPs/BSs rather than reporting a first peak exceeding a specific threshold value through one cross-correlation operation.

The RSs may be dedicatedly configured/indicated RSs for positioning or CSI-RSs. In the case of the CSI-RSs, the BS/LMF/location server may indicate to the UE that specific CSI-RS resources and/or CSI-RS resource sets are used for positioning. Alternatively, if ToA/RSTD is indicated/configured as reporting content indicated in association/linkage with a specific configured CSI-RS resource and/or CSI-RS resource set, the UE may recognize that the CSI-RSs are used for positioning.

The BS/LMF/location server may configure/reconfigure the cross-correlation search window used by the UE during transmission of a PRS using a sequence independently allocated by a specific TRP/BS/cell based on reporting information of the UE. For example, the BS/LMF/location server may reconfigure/configure, for the UE, a search window for a TRP/BS that has allocated a common sequence based on a minimum ToA and a maximum ToA. The above-described reporting operation may be configured/indicated in consideration of TX/RX beam sweeping. For example, a ToA/RSTD reporting operation for a specific TX beam or specific PRS resource may be configured.

(7) Embodiment 7: RS Configuration and Reporting Configuration for Performing Positioning Using CSI-RS The BS/LMF/location server may use a CSI-RS for UE positioning. For example, a CSI-RS for beam management may be used for UE positioning. Alternatively, an additional CSI-RS resource and/or a CSI-RS resource set may be allocated for UE positioning.

The BS/LMF/location server may configure a CSI-RS resource and/or a CSI-RS resource set for the UE and also configure/indicate, for/to the UE, a ToA, RSTD, and/or AoA as a reporting configuration linked to the CSI-RS resource and the CSI-RS resource set.

For example, only a CSI-RS resource set in which a higher layer parameter "repetition" is configured may be limitedly used for UE positioning. ToA/RSTD reporting may be configured/indicated for/to the UE in association with a CSI-RS resource set and/or a CSI-RS resource configuration in which the higher layer parameter "repetition" is set to "ON" or "OFF". If the UE is configured/instructed to report ToA/RSTD measurement together with RSRP information acquired through the CSI-RS to the BS, the BS may transmit information about ToA/RSTD to the LMF/location server. Alternatively, the LMF/location server may request that the BS transmit the information about ToA/RSTD.

The BS/LMF/location server may configure/instruct the UE to report ToA/RSTD using the CSI-RS. The BS/LMF/location server may configure, for the UE, a CSI-RS resource and/or a CSI-RS resource set and also configure a search window for a cross-correlation operation in association/linkage with the CSI-RS resource and/or CSI-RS resource set. Such a search window may be configured only when reporting content is ToA/RSTD in linkage with a reporting configuration for the CSI-RS resource and/or CSI-RS resource set. To configure the search window for the UE in linkage with the reporting content, the LMF/location server may inform the BS of the search window.

In regard to the reporting configuration related to ToA, the UE may be configured to report ToA among ToA values measured for all CSI-RS resources of a specific CSI-RS resource set. In this case, a minimum ToA among ToA measurement values for CSI-RS resources of the CSI-RS resource set may be reported to the BS/LMF/location server. Alternatively, the minimum ToA and a CSI-RS resource index corresponding thereto may be reported to the BS/LMF/location server. The above-described operation of the UE may be configured/indicated to the UE by the BS/LMF/location server.

The BS may configure a specific CSI-RS resource set such that the UE may measure ToA for a specific TP/BS. When the configuration parameter "repetition" of the CSI-RS resource set is set to "OFF", the TP/BS may transmit the CSI-RS on a plurality of symbols while sweeping a TX beam. The UE may measure, through a fixed RX beam, ToA for CSI-RS resources transmitted through a plurality of TX beams by the TP/BS. Since received power of the UE for a line-of-sight (LoS) component may differ according to a TX beam direction, ToA values measured for CSI-RS resources may differ. Accordingly, it is desirable to report a value that has reflected LoS best among LoS measurement values for respective CSI-RS resources to the BS/LMF/location server.

For example, generally, since a CSI-RS resource having the shortest ToA may be recognized as a value that has reflected LoS best, the UE may report the CSI-RS resource having the shortest ToA to the BS/LMF/location server. ToA and RSRP may be used together, so that the UE may report a CSI-RS resource having the shortest ToA and a CSI-RS resource having the largest RSRP, among CSI-RS resources on which ToA is shorter than a first threshold value and RSRP is larger than a second threshold value, to the BS/LMF/location server. This may be equally applied even when the CSI-RS resource set is configured as repetition="OFF".

The CSI-RS may UE-transparently operate in a multi-cell and/or multi-TRP environment. Accordingly, even for UL-based UE positioning, the UE may transmit a UL RS such as an SRS in a direction corresponding to a minimum ToA. For example, when a specific TP/BS transmits a plurality of CSI-RS resources included in a specific CSI-RS resource set while performing TX beam sweeping in the time domain, the UE may transmit the SRS in a direction corresponding to a specific CSI-RS resource having the minimum ToA.

Specifically, when a specific CSI-RS resource set is configured as repetition="ON", the UE may recognize that the CSI-RS is transmitted in a plurality of symbols through the same TX beam by a specific TP/BS. The UE may measure ToA for each CSI-RS resource while sweeping an RX beam as many times as the number of CSI-RS resources included in the CSI-RS resource set and determine an RX beam direction in which a minimum ToA value may be obtained among configured CSI-RS resources.

The UE may transmit a UL RS such as an SRS based on the determined RX beam direction while UTDOA based UE positioning is performed. That is, the UE may transmit the SRS in the direction of a beam corresponding to a CSI-RS resource of the CSI-RS resource set. In this case, the BS may not configure additional quasi co-location (QCL) for the UE and the BS/LMF/location server may configure/instruct the UE to determine a UL beam direction as a direction corresponding to a CSI-RS resource with a minimum ToA value.

The above-described method may be extended to/applied to/used in a PRS. The UE may measure ToA for a PRS transmitted through a plurality of TX beams by a specific TP/BS and transmit a UL RS such as an SRS in a beam direction corresponding to a PRS resource having a minimum ToA among measured ToA values. The BS/LMF/location server may configure/indicate the above operation.

Unlike the CSI-RS, the PRS may have no configuration of repetition="OFF" or repetition="ON". In this case, the PRS block/PRS occasion/PRS occasion group may be defined/configured/indicated as described above in consideration of TX/RX beam sweeping. In the case of the PRS, a beam through which a UL SRS is transmitted to a specific TRP/BS in linkage with a physical cell ID or a virtual cell ID may be configured/indicated in units of a specific TP/cell or a specific TP/cell group. This operation may be configured/indicated for/to the UE by the BS/LMF/location server.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 22:
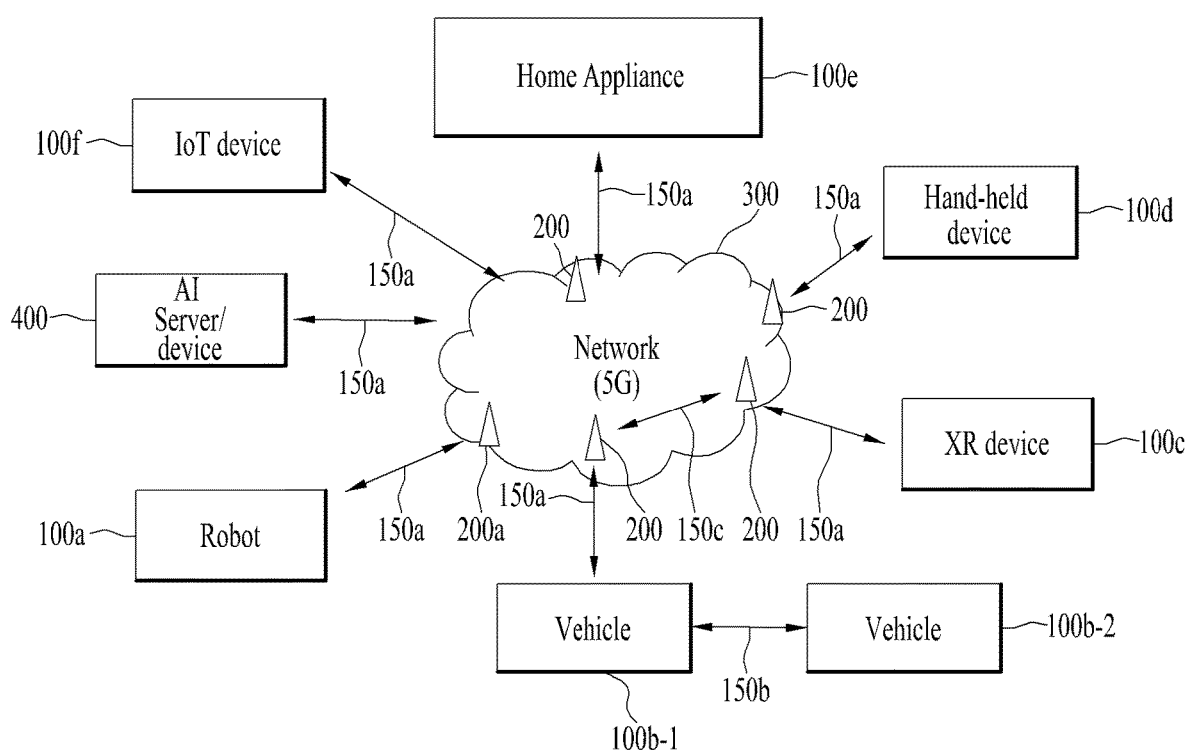
FIG. 22 shows an exemplary communication system to which embodiments of the present disclosure are applied.

FIG. 22 illustrates a communication system 1 applied to the present disclosure.

Referring to FIG. 22, a communication system 1 applied to the present disclosure includes wireless devices, BSs, and a network. Herein, the wireless devices represent devices performing communication using radio access technology (RAT) (e.g., 5G new RAT (NR)) or long-term evolution (LTE)) and may be referred to as communication/radio/5G devices. The wireless devices may include, without being limited to, a robot 100a, vehicles 100b-1 and 100b-2, an extended reality (XR) device 100c, a hand-held device 100d, a home appliance 100e, an Internet of things (IoT) device 100f, and an artificial intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, integrated access backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 23:
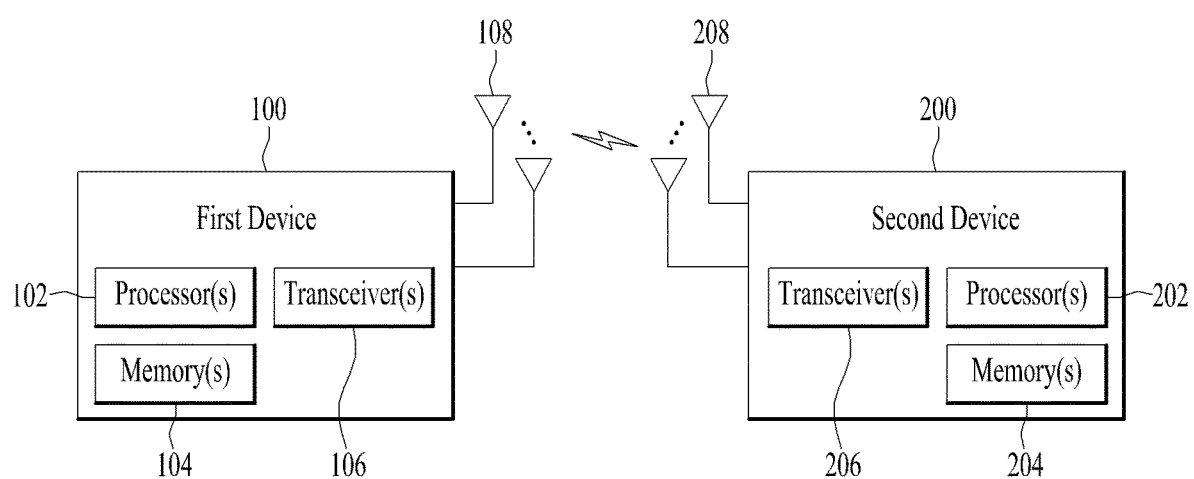
FIGS. 23 to 26 show examples of various wireless devices to which embodiments of the present disclosure are applied.

FIG. 23 illustrates wireless devices applicable to the present disclosure.

Referring to FIG. 23, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 22.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

Specifically, commands and/or operations controlled by the processor 102 and stored in the memory 104 in the wireless device 100 according to an embodiment of the present disclosure will be described below.

While the operations are described in the context of a control operation of the processor 102 from the perspective of the processor 102, software code for performing these operations may be stored in the memory 104

The processor 102 may control the transceiver 106 to receive information on PRS resource configuration and information on PRS reporting configuration. A detailed example of a method for configuring a PRS resource and PRS reporting and information therefor may be based on Embodiments 1 to 7.

The processor 102 may control the transceiver 106 to receive the PRS based on the PRS resource configuration. The processor 102 may perform a measurement related to the PRS based on the received PRS and the PRS reporting configuration, and may control the transceiver 106 to report the measurement related to the PRS. A specific method for controlling the transceiver 106 such that the processor 102 receives the PRS, and controlling the transceiver 106 to perform and report a related measurement may be based on Embodiments 1 to 7.

Specifically, commands and/or operations controlled by the processor 202 of the second wireless device 200 and stored in the memory 204 according to an embodiment of the present invention will be described.

While the following operations are described based on the control operation of the processor 202 from the perspective of the processor 202, software code or the like for performing these operations may be stored in the memory 204. The processor 202 may control the transceiver 206 to transmit, to the location server 90 of FIG. 27, information including an indication that an SS/PBCH block and/or a CSI-RS will be used as a PRS resource, or will be transmitted to determine a transmission/reception beam for transmitting/receiving a PRS resource.

The processor 202 may control the transceiver 206 to transmit information on PRS resource configuration and information on PRS reporting configuration. A detailed example of a method for configuring a PRS resource and PRS reporting and information therefor may be based on Embodiments 1 to 7.

The processor 202 may control the transceiver 206 to transmit the PRS based on the PRS resource configuration and control the transceiver 206 to receive a report related to the PRS measurement based on the PRS reporting configuration. A specific method for the processor 202 to control the transceiver 206 to transmit a PRS and control the transceiver 206 to receive a report related to the PRS measurement may be based on Embodiments 1 to 7.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more protocol data units (PDUs) and/or one or more service data units (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 24:
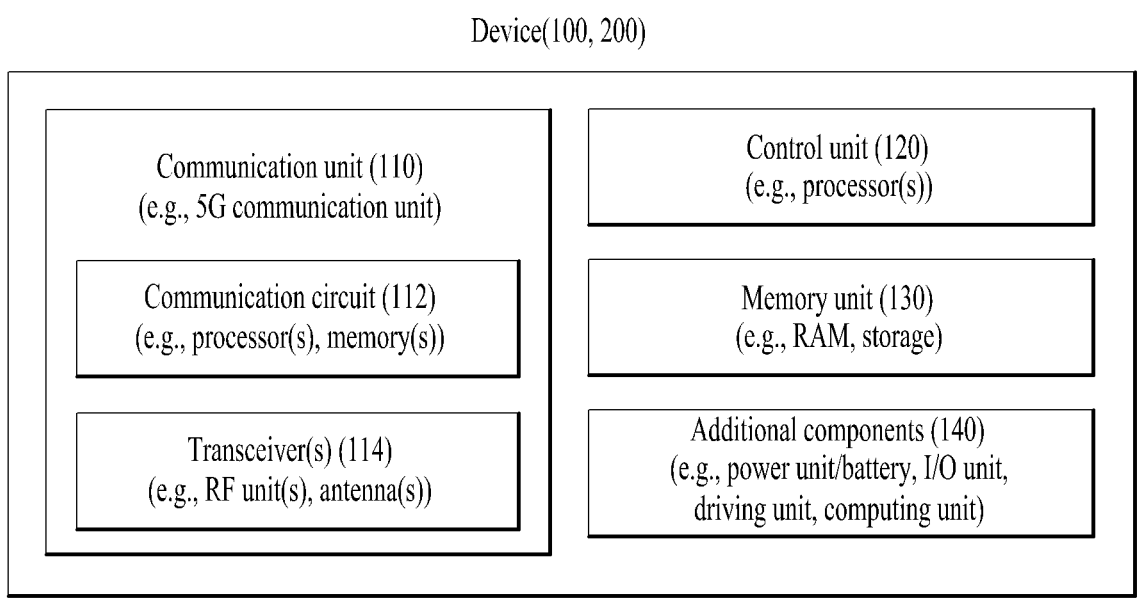

FIG. 24 illustrates another example of a wireless device applied to the present disclosure. The wireless device may be implemented in various forms according to a use-case/service (refer to FIG. 22)

Referring to FIG. 24, wireless devices 100 and 200 may correspond to the wireless devices 100 and 200 of FIG. 23 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 23. For example, the transceiver(s) 114 may include the one or more transceivers 106 and 206 and/or the one or more antennas 108 and 208 of FIG. 23. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110. Accordingly, the specific operation of the control unit 120 and the programs/code/commands/information stored in the memory unit 130 according to the present disclosure may correspond to the operation of at least one of the processors 102 and 202 and the operation of at least one of the memories 104 and 204 in FIG. 23.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 22), the vehicles (100b-1 and 100b-2 of FIG. 22), the XR device (100c of FIG. 22), the hand-held device (100d of FIG. 22), the home appliance (100e of FIG. 22), the IoT device (100f of FIG. 22), a digital broadcast terminal, a hologram device, a public safety device, an MTC device, a medicine device, a fintech device (or a finance device), a security device, a climate/environment device, the AI server/device (400 of FIG. 22), the BSs (200 of FIG. 22), a network node, etc. The wireless device may be used in a mobile or fixed place according to a use-example/service.

In FIG. 24, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 25:
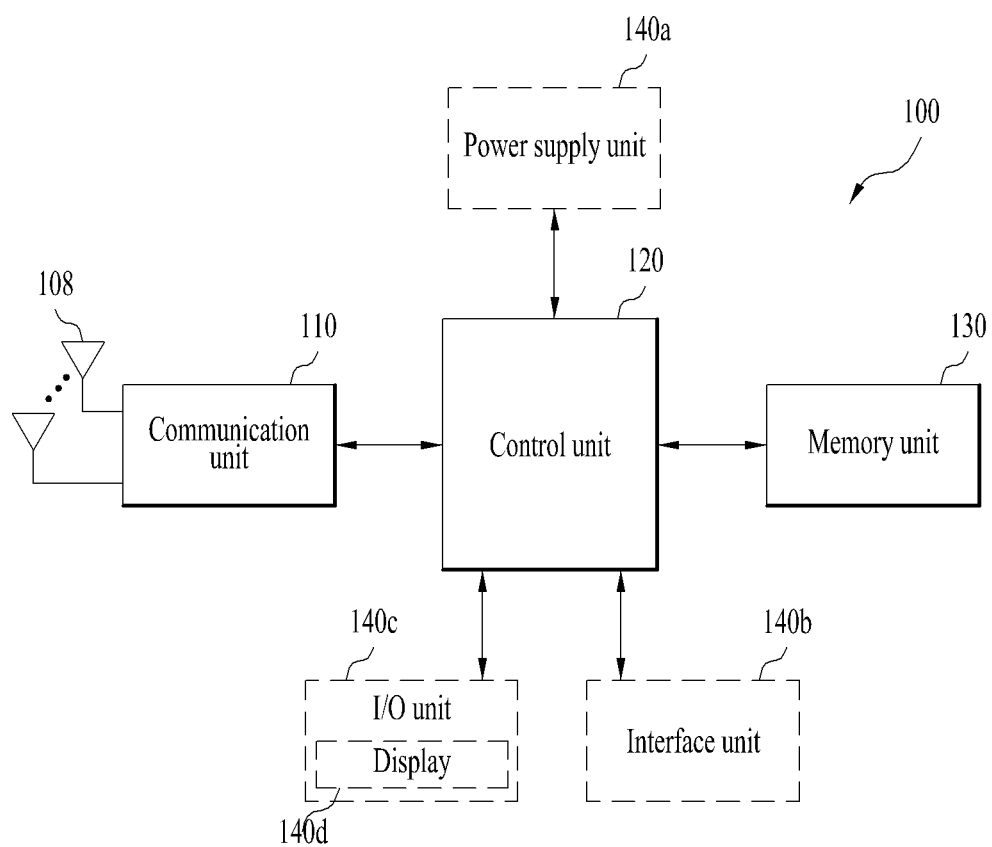

FIG. 25 illustrates an exemplary portable device to which the present disclosure is applied. The portable device may be any of a smartphone, a smart pad, a wearable device (e.g., a smart watch or smart glasses), and a portable computer (e.g., a laptop). A portable device may also be referred to as mobile station (MS), user terminal (UT), mobile subscriber station (MSS), subscriber station (SS), advanced mobile station (AMS), or wireless terminal (WT).

Referring to FIG. 25, a portable device 100 may include an antenna unit 108, a communication unit 110, a control unit 120, a memory unit 130, a power supply unit 140a, an interface unit 140b, and an input/output (I/O) unit 140c. The antenna unit 108 may be configured as a part of the communication unit 110. Blocks 110 to 130/140a to 140c correspond to the blocks 110 to 130/140 of FIG. 14, respectively.

The communication unit 110 may transmit and receive signals (e.g., data and control signals) to and from other wireless devices or BSs. The control unit 120 may perform various operations by controlling components of the portable device 100. The control unit 120 may include an application processor (AP). The memory unit 130 may store data/parameters/programs/code/instructions needed to drive the portable device 100. Further, the memory unit 130 may store input/output data/information. The power supply unit 140a may supply power to the portable device 100 and include a wired/wireless charging circuit, a battery, and so on. The interface unit 140b may support connection of the portable device 100 to other external devices. The interface unit 140b may include various ports (e.g., an audio I/O port and a video I/O port) for connection to external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

For example, in data communication, the I/O unit 140c may obtain information/signals (e.g., touch, text, voice, images, or video) input by the user, and the stored information/signals may be stored in the memory unit 130. The communication unit 110 may convert the information/signals stored in the memory into radio signals and transmit the radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 26:
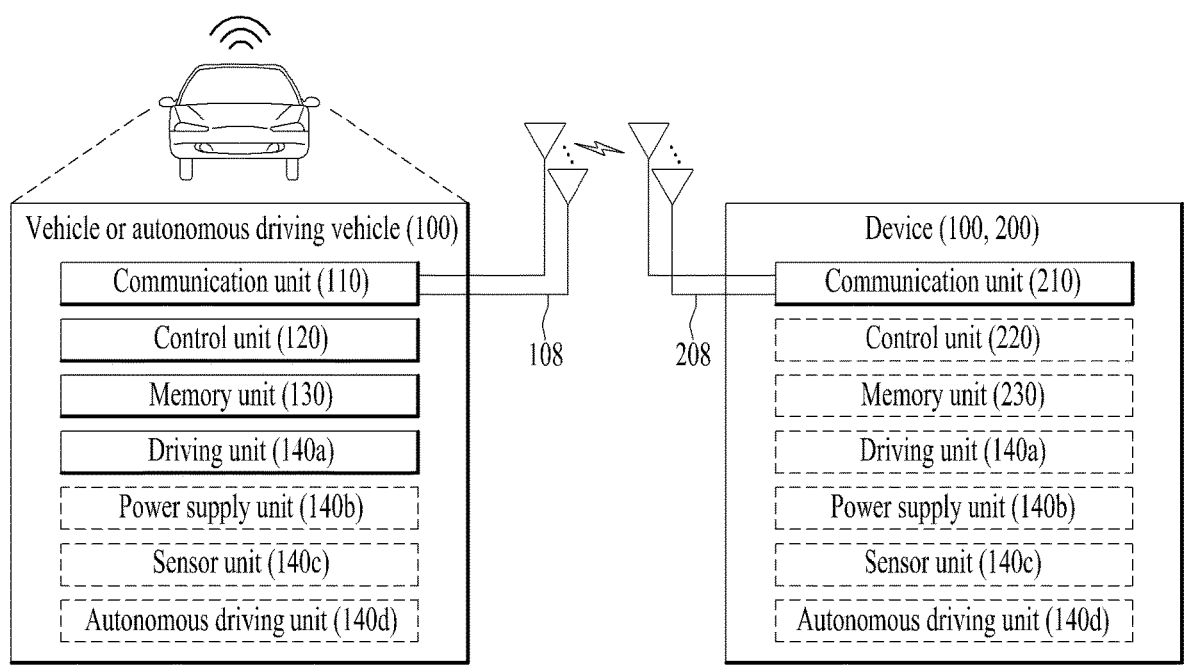

FIG. 26 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 26, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 25, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

In order to carry out embodiments according to the present disclosure, a location server 90 as shown in FIG. 27 may be included. Here, the location server 90 may be logically or physically connected to the wireless device 70 and/or the network node 80. The wireless device 70 may be the first wireless device 100 of FIG. 23 and/or the wireless devices 100 and 200 of FIG. 24. Also, the network node 80 may be the second wireless device 100 of FIG. 23 and/or the wireless devices 100 and 200 of FIG. 24.

The location server 90 may be an AMF, LMF, E-SMLC and/or SLP, but is not limited thereto. Any communication device may be utilized as the location server 90 as long as it is a communication device capable of serving as the location server 90 to implement an embodiment of the present disclosure. In particular, the location server 90 is named location server for convenience of description, but may not be implemented in the form of a server. The location server may be implemented in the form of a chip. In this case, the chip may be implemented to perform all the functions of the location server 90, which will be described later.

The location server 90 will be described in detail. The location server 90 includes a transceiver 91 configured to communicate with one or more other wireless devices, network nodes and/or other elements of the network. Here, the transceiver 91 may include one or more communication interfaces. It communicates with one or more other wireless devices, network nodes and/or other elements of the network connected through the communication interface.

The location server 90 also includes a processing chip 92. The processing chip 92 may include at least one processor, such as a processor 93, and at least one memory device, such as a memory 94.

The processing chip 92 may control one or more processes to implement the methods described herein and/or embodiments for the objects to be achieved in the present disclosure and solutions thereto. In other words, the processing chip 92 may be configured to carry out at least one or more of the embodiments described herein. That is, the processor 93 includes at least one processor configured to perform the function of the location server 90 described herein. For example, the at least one processor may control one or more transceivers 91 of FIG. 27 to transmit and receive information.

The processing chip 92 also includes a memory 94 configured to store data, programmable software code, and/or other information for carrying out the embodiments described herein.

In other words, in the embodiments according to the present specification, when executed by at least one processor such as the processor 93, the memory 94 causes the processor 93 to perform some or all processes controlled by the processor 93 of FIG. 27, or stores software code 95 including instructions for carrying out the embodiments described herein.

Specifically, commands and/or operations controlled by the processor 93 of the location server 90 and stored in the memory 94 according to an embodiment of the present disclosure will be described.

While the following operations are described based on the control operation of the processor 93 from the perspective of the processor 93, software code or the like for performing these operations may be stored in the memory 94. The processor 93 may control the transceiver 91 to transmit information on PRS resource configuration and information on PRS reporting configuration. A detailed example of a method for configuring a PRS resource and PRS reporting and information therefor may be based on Embodiments 1 to 7.

The processor 93 may control the transceiver 91 to receive a report related to PRS measurement based on the PRS reporting configuration. A specific method for controlling the transceiver 91 such that the processor 93 receives a report related to the PRS measurement may be based on Embodiments 1 to 7.

Figure 28:
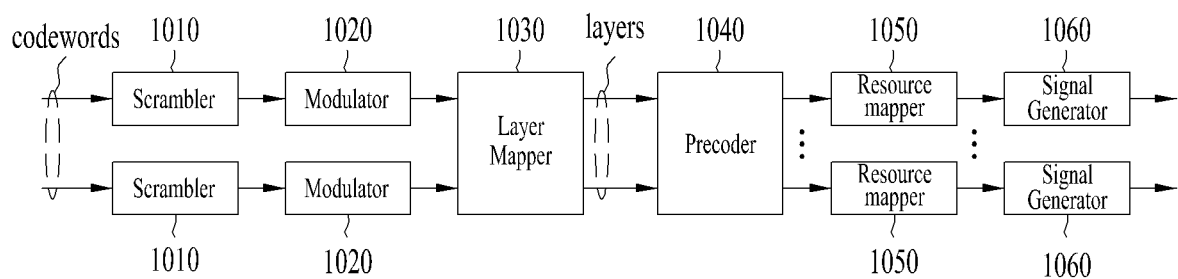
FIG. 28 shows an exemplary signal processing circuit to which embodiments of the present disclosure are applied.

FIG. 28 illustrates a signal process circuit for a transmission signal.

Referring to FIG. 28, a signal processing circuit 1000 may include scramblers 1010, modulators 1020, a layer mapper 1030, a precoder 1040, resource mappers 1050, and signal generators 1060. An operation/function of FIG. 28 may be performed, without being limited to, the processors 102 and 202 and/or the transceivers 106 and 206 of FIG. 23. Hardware elements of FIG. 31 may be implemented by the processors 102 and 202 and/or the transceivers 106 and 206 of FIG. 23. For example, blocks 1010 to 1060 may be implemented by the processors 102 and 202 of FIG. 23. Alternatively, the blocks 1010 to 1050 may be implemented by the processors 102 and 202 of FIG. 23 and the block 1060 may be implemented by the transceivers 106 and 206 of FIG. 23.

Codewords may be converted into radio signals via the signal processing circuit 1000 of FIG. 28. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH)

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 25. For example, the wireless devices (e.g., 100 and 200 of FIG. 20) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders The implementations described above are those in which the elements and features of the present disclosure are combined in a predetermined form. Each component or feature shall be considered optional unless otherwise expressly stated. Each component or feature may be implemented in a form that is not combined with other components or features. It is also possible to construct implementations of the present disclosure by combining some of the elements and/or features. The order of the operations described in the implementations of the present disclosure may be changed. Some configurations or features of certain implementations may be included in other implementations, or may be replaced with corresponding configurations or features of other implementations. It is clear that the claims that are not expressly cited in the claims may be combined to form an implementation or be included in a new claim by an amendment after the application.

The specific operation described herein as being performed by the base station may be performed by its upper node, in some cases. That is, it is apparent that various operations performed for communication with a terminal in a network including a plurality of network nodes including a base station can be performed by the base station or by a network node other than the base station. A base station may be replaced by terms such as a fixed station, a Node B, an eNode B (eNB), an access point, and the like.

It will be apparent to those skilled in the art that the present disclosure may be embodied in other specific forms without departing from the spirit of the disclosure. Accordingly, the above description should not be construed in a limiting sense in all respects and should be considered illustrative. The scope of the present disclosure should be determined by rational interpretation of the appended claims, and all changes within the scope of equivalents of the present disclosure are included in the scope of the present disclosure.

Although a method and device for transmitting and receiving positioning information have been described mainly focusing on examples applied to the 5th generation NewRAT system, they may also be applied to various wireless communication systems other than the 5th generation NewRAT system.

What is claimed is:

1. A method of performing a measurement by a user equipment (UE) in a wireless communication system, the method comprising:
    receiving first information related to a plurality of positioning reference signal (PRS) resource sets including a plurality of PRS resources;
    receiving second information regarding a specific PRS resource set related to the measurement
    performing the measurement based on the first information; and
    reporting, based on the measurement performed based on a PRS resource set different from the specific PRS resource set, resource information including an identifier (ID) for the PRS resource set.

2. The method of claim 1, wherein the UE further reports an ID for a transmission and reception point (TRP) assigned the PRS resource set.

3. The method of claim 1, further comprising reporting positioning information including a result of the measurement, and
    wherein the result of the measurement includes reference signal received powers (RSRPs) or signal to interference and noise ratios (SINRs) for each of the plurality of PRS resources.

4. The method of claim 1, wherein the measurement is performed on the PRS resource set based on the PRS resource set including a PRS resource having a highest RSRP among the RSRPs or a PRS resource having a highest SINR among the SINRs.

5. The method of claim 1, wherein the plurality of PRS resource sets is related to a single transmission and reception point (TRP).

6. The method of claim 1, wherein the UE is capable of communicating with at least one of a UE other than the UE, a network, a base station, and an autonomous vehicle.

7. An apparatus for performing a measurement in a wireless communication system, comprising:
    at least one processor; and
    at least one memory operably connected to the at least one processor and configured to store instructions causing, when executed, the at least one processor to perform a specific operation;
    wherein the specific operation comprises:
    receiving first information related to a plurality of positioning reference signal (PRS) resource sets including a plurality of PRS resources;
    receiving second information regarding a specific PRS resource set related to the measurement
    performing the measurement based on the first information; and
    reporting, based on the measurement performed based on a PRS resource set different from the specific PRS resource set, resource information including an identifier (ID) for the PRS resource set.

8. The apparatus of claim 7, wherein the specific operation further includes reporting an ID for a transmission and reception point (TRP) assigned the PRS resource set.

9. The apparatus of claim 7, wherein the specific operation further includes reporting positioning information including a result of the measurement, and
    wherein the result of the measurement includes reference signal received powers (RSRPs) or signal to interference and noise ratios (SINRs) for each of the plurality of PRS resources.

10. The apparatus of claim 7, wherein the measurement is performed on the PRS resource set based on the PRS resource set including a PRS resource having a highest RSRP among the RSRPs or a PRS resource having a highest SINR among the SINRs.

11. The apparatus of claim 7, wherein the plurality of PRS resource sets is related to a single transmission and reception point (TRP).

12. The apparatus of claim 7, wherein the apparatus is capable of communicating with at least one of a terminal, a network, a base station, and an autonomous vehicle.

13. A user equipment (UE) for performing a measurement in a wireless communication system, comprising:
    at least one transceiver;
    at least one processor; and
    at least one memory operably connected to the at least one processor and configured to store instructions causing, when executed, the at least one processor to perform a specific operation,
    wherein the specific operation comprises:
    receiving first information related to a plurality of positioning reference signal (PRS) resource sets including a plurality of PRS resources through the at least one transceiver;
    receiving second information regarding a specific PRS resource set related to the measurement;
    performing the measurement based on the first information; and
    reporting, based on the measurement performed based on a PRS resource set different from the specific PRS resource set, resource information including an identifier (ID) for the PRS resource set, through the at least one transceiver.

* * * * *